(12) United States Patent
Jeong et al.

(10) Patent No.: US 12,418,625 B2
(45) Date of Patent: Sep. 16, 2025

(54) ELECTRONIC DEVICE FOR PLAYING VIDEO AND METHOD FOR PLAYING VIDEO

(71) Applicant: Samsung Electronics Co., Ltd., Suwon-si (KR)

(72) Inventors: Jaehyeon Jeong, Suwon-si (KR); Jiyoung Bang, Suwon-si (KR); Keunha Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 18/153,701

(22) Filed: Jan. 12, 2023

(65) Prior Publication Data
US 2023/0171376 A1    Jun. 1, 2023

Related U.S. Application Data

(63) Continuation of application No. PCT/KR2021/003482, filed on Mar. 22, 2021.

(30) Foreign Application Priority Data

Jul. 28, 2020  (KR) .................. 10-2020-0094033

(51) Int. Cl.
*G11B 27/00* (2006.01)
*H04N 5/77* (2006.01)
(Continued)

(52) U.S. Cl.
CPC ......... *H04N 7/0127* (2013.01); *G11B 27/005* (2013.01); *H04N 5/77* (2013.01)

(58) Field of Classification Search
CPC .............. G11B 27/005; G11B 27/00; H04N 21/440281; H04N 21/44029;
(Continued)

(56) References Cited

U.S. PATENT DOCUMENTS

| 6,970,163 B2 | 11/2005 | Cairns et al. |
| 8,274,501 B2 | 9/2012 | Kwa et al. |

(Continued)

FOREIGN PATENT DOCUMENTS

| JP | 2013/128266 A | 6/2013 |
| JP | 2007/271908 A | 10/2017 |

(Continued)

OTHER PUBLICATIONS

Korean Office Action with English translation dated Aug. 6, 2024; Korean Appln. No. 10-2020-0094033.

(Continued)

*Primary Examiner* — Daquan Zhao
(74) *Attorney, Agent, or Firm* — Jefferson IP Law, LLP

(57) ABSTRACT

An electronic device is provided. The electronic device includes a communication circuit, a memory which stores instructions, and a processor operatively connected to the communication circuit and the memory. The processor may be configured to determine a first output frame rate on the basis of a display refresh rate, output, through the display, first playback video data having a first playback frame rate, receive a user input which enables the first playback frame rate to change to a second playback frame rate, change, in response to the user input, the frame rate of the first playback video data to the second playback frame rate, and output, through the display, first corrected video data generated to have the first output frame rate from the first playback video data having the second playback frame rate.

14 Claims, 27 Drawing Sheets

(51) Int. Cl.
*H04N 7/01* (2006.01)
*H04N 21/40* (2011.01)
*H04N 21/00* (2011.01)
*H04N 21/20* (2011.01)

(58) Field of Classification Search
CPC ...... H04N 21/4621; H04N 5/77; H04N 5/783; H04N 7/0127; H04N 21/00; H04N 21/20; H04N 21/40; H04N 21/60; H04N 21/80
USPC .......................... 386/280, 278, 282, 200, 201
See application file for complete search history.

(56) References Cited

U.S. PATENT DOCUMENTS

| | | | |
|---|---|---|---|
| 8,872,812 B2 * | 10/2014 | Greenberg | G06F 1/3203 345/419 |
| 9,524,008 B1 | 12/2016 | Woodall et al. | |
| 9,924,134 B2 | 3/2018 | Glen | |
| 10,249,253 B2 | 4/2019 | Lee et al. | |
| 2011/0149169 A1 | 6/2011 | Oami et al. | |
| 2013/0100176 A1 | 4/2013 | Lewis et al. | |
| 2013/0141642 A1 | 6/2013 | Wu et al. | |
| 2013/0257752 A1 * | 10/2013 | Tripathi | G09G 3/20 345/545 |
| 2014/0085276 A1 | 3/2014 | Jang et al. | |
| 2014/0267448 A1 | 9/2014 | Albrecht et al. | |
| 2015/0138242 A1 | 5/2015 | Kim et al. | |
| 2015/0189126 A1 * | 7/2015 | Xie | G09G 5/005 348/500 |
| 2016/0100129 A1 | 4/2016 | Im | |
| 2019/0045116 A1 * | 2/2019 | Yamamoto | G09G 5/003 |
| 2020/0192500 A1 | 6/2020 | Tripathi et al. | |
| 2021/0133475 A1 * | 5/2021 | Sudar | G06V 20/42 |

FOREIGN PATENT DOCUMENTS

| | | |
|---|---|---|
| KR | 10-2016-0025198 A | 3/2016 |
| KR | 10-2016-0040388 A | 4/2016 |
| KR | 10-2105171 B1 | 4/2020 |

OTHER PUBLICATIONS

Korean Notice of Patent Grant dated Apr. 21, 2025, issued in Korean Application No. 10-2020-0094033.

* cited by examiner

ELECTRONIC DEVICE FOR PLAYING VIDEO AND METHOD FOR PLAYING VIDEO

CROSS-REFERENCE TO RELATED APPLICATION(S)

This application is a continuation application, claiming priority under § 365(c), of an International application No. PCT/KR2021/003482, filed on Mar. 22, 2021, which is based on and claims the benefit of a Korean patent application number 10-2020-0094033, filed on Jul. 28, 2020, in the Korean Intellectual Property Office, the disclosure of which is incorporated by reference herein in its entirety.

BACKGROUND

1. Field

The disclosure relates to a device for reproducing a video and a method for reproducing a video.

2. Description of Related Art

A reproduction system of an electronic device may reproduce a video content together with an audio content. The reproduction system may transmit an image frame of the video content to a display to reproduce the video content. Here, the reproduction system may transmit the image frame to the display at every cycle according to the frame rate of the video content. The frame rate means the number of frames per unit time. For example, the frame rate may mean the number of frames per second (fps). The video content may have a content frame rate corresponding to the number of frames expressed by an original image per unit time. When the electronic device reproduces the video content according to the reproduction configuration, frames of the video content may be reproduced based on the reproduction frame rate. For example, when a video having a content frame rate of 48 fps is reproduced at double speed, frames may be reproduced at a reproduction frame rate of 96 fps.

The display periodically updates the transmitted image frame on a screen, based on a display refresh rate (DRR) of the display. The display refresh rate refers to a period in which a screen actually displayed on the display is updated. The display refresh rate may be a value specified by a manufacturer who manufactures the display, and may be changed by controlling the display.

The above information is presented as background information only to assist with an understanding of the disclosure. No determination has been made, and no assertion is made, as to whether any of the above might be applicable as prior art with regard to the disclosure.

SUMMARY

The reproduction system of the electronic device transmits image frames to the display at a cycle according to the frame rate of the video content, but because the display updates the screen at a cycle according to the display refresh rate, the cycle in which the image frame is transmitted to the display and the cycle in which the screen is updated by the display may not coincide.

When the electronic device reproduces content having a frame rate higher than the display refresh rate, the display transmits the frame to the display more frequently than the screen refresh rate, so that some of the frames transferred to the display may not be displayed on the screen. Accordingly, since a frame not displayed on the screen is processed, resources of the electronic device may be wasted.

Conversely, when the electronic device reproduces the content having a frame rate lower than the display refresh rate, there may not be a new frame transmitted from the reproduction system when the display updates the screen. When there is no new frame at the time of updating the screen, the display may maintain the previously displayed frame. In this case, sufficient image quality according to the display refresh rate of the display is not provided.

Aspects of the disclosure are to address at least the above-mentioned problems and/or disadvantages and to provide at least the advantages described below. Accordingly, aspects of the disclosure are to provide an electronic device for playing video and method for playing video.

Additional aspects will be set forth in part in the description which follows and, in part, will be apparent from the description, or may be learned by practice of the presented embodiments In accordance with an aspect of the disclosure, an electronic device is provided. The electronic device includes a display that displays a screen, based on a display refresh (update) rate, a memory, and at least one processor operatively connected to the display and the memory.

The at least one processor according to various embodiments may be configured to determine a first output frame rate, based on the display refresh rate, output first reproduction video data having a first reproduction frame rate through the display, receive a user input for changing the first reproduction frame rate to a second reproduction frame rate, change a frame rate of the first reproduction video data to the second reproduction frame rate, and output first modified video data generated to have a first output frame rate from the first reproduction video data having the second reproduction frame rate through the display, in response to the user input.

In accordance with another aspect of the disclosure, a method of operating an electronic device is provided. The method includes obtaining a display refresh rate of the display, determining a first output frame rate, based on the display refresh rate, outputting first reproduction video data having a first reproduction frame rate through the display, receiving a user input for changing the first reproduction frame rate to a second reproduction frame rate, changing, in response to the user input, a frame rate of the first reproduction video data to the second reproduction frame rate, and outputting first modified video data generated to have a first output frame rate from the first reproduction video data having the second reproduction frame rate through the display.

An electronic device according to various embodiments may include a display that displays a screen, based on a display refresh(update) rate, a memory, and at least one processor operatively connected to the display and the memory.

The at least one processor according to various embodiments may be configured to output reproduction video data having a reproduction frame rate through the display, determine content information about the content of the playback video data, and output the modified video data generated from the reproduced video data through the display to have an output frame rate determined based on the changed content information and the display refresh rate, when the content information is changed.

An electronic device and an operating method thereof according to various embodiments of the disclosure may adaptively adjust the frame rate of the video content according to the display refresh rate of the display device while the video content is being reproduced.

Another aspect of the disclosure is to provide an electronic device and a video reproduction method for performing a process of adaptively adjusting a frame rate within a limited resource according to the context of the electronic device reproducing the video.

Various embodiments may adaptively reproduce video data according to a user's interaction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
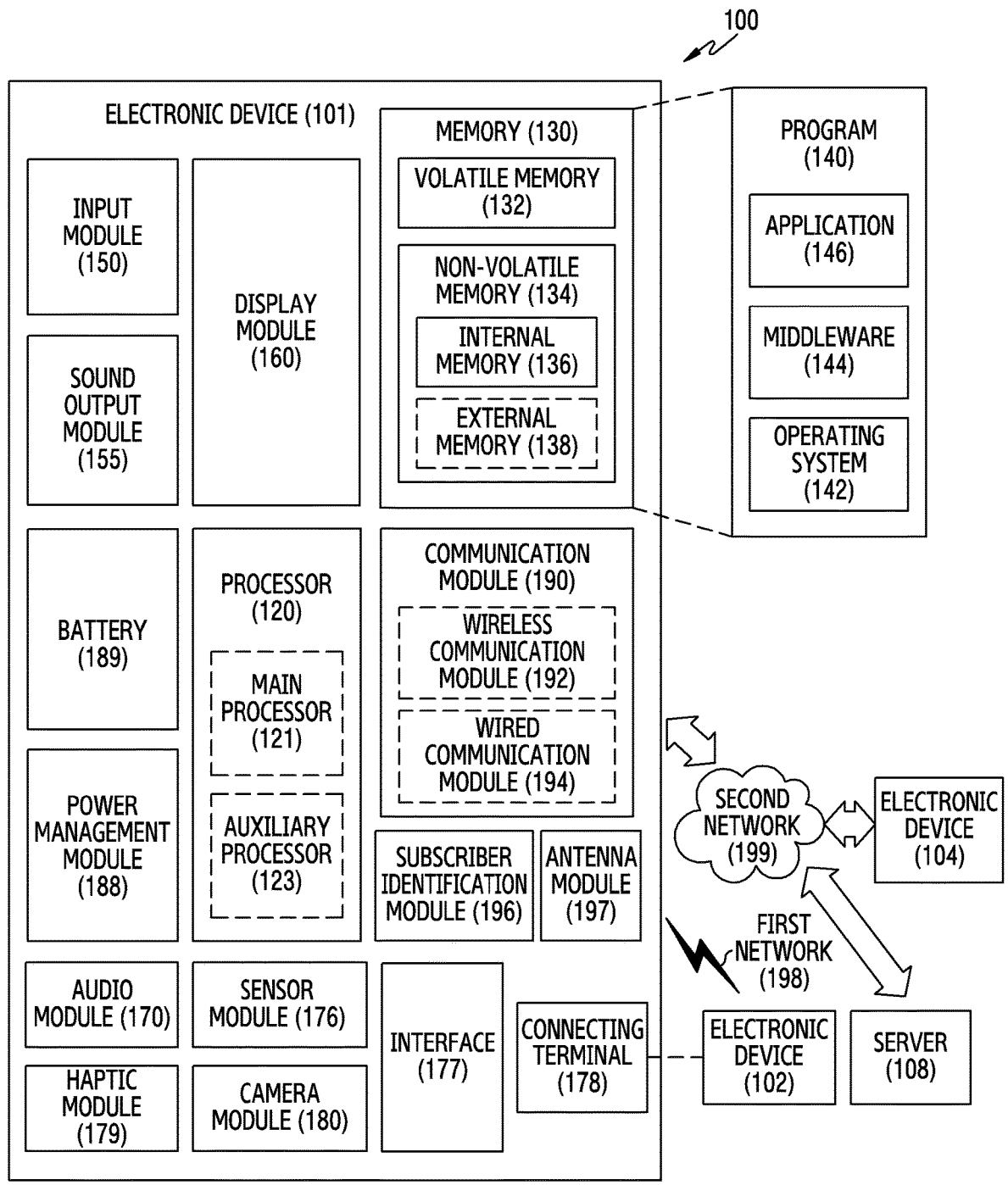
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
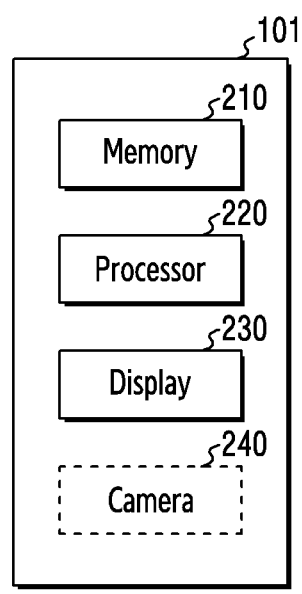
FIG. 2 is a diagram illustrating a configuration of an electronic device according to an embodiment of the disclosure.

FIG. 2 is a diagram illustrating a configuration of an electronic device (e.g., the electronic device 101 of FIG. 1) according to an embodiment of the disclosure.

The electronic device 101 according to various embodiments may include a memory 210 (e.g., the memory 130 of FIG. 1), a processor 220 (e.g., the processor 120 of FIG. 1), and a display 230 (e.g., the display module 160 of FIG. 1). The module included in the electronic device 101 may include a hardware module (e.g., a circuit).

Figure 4:
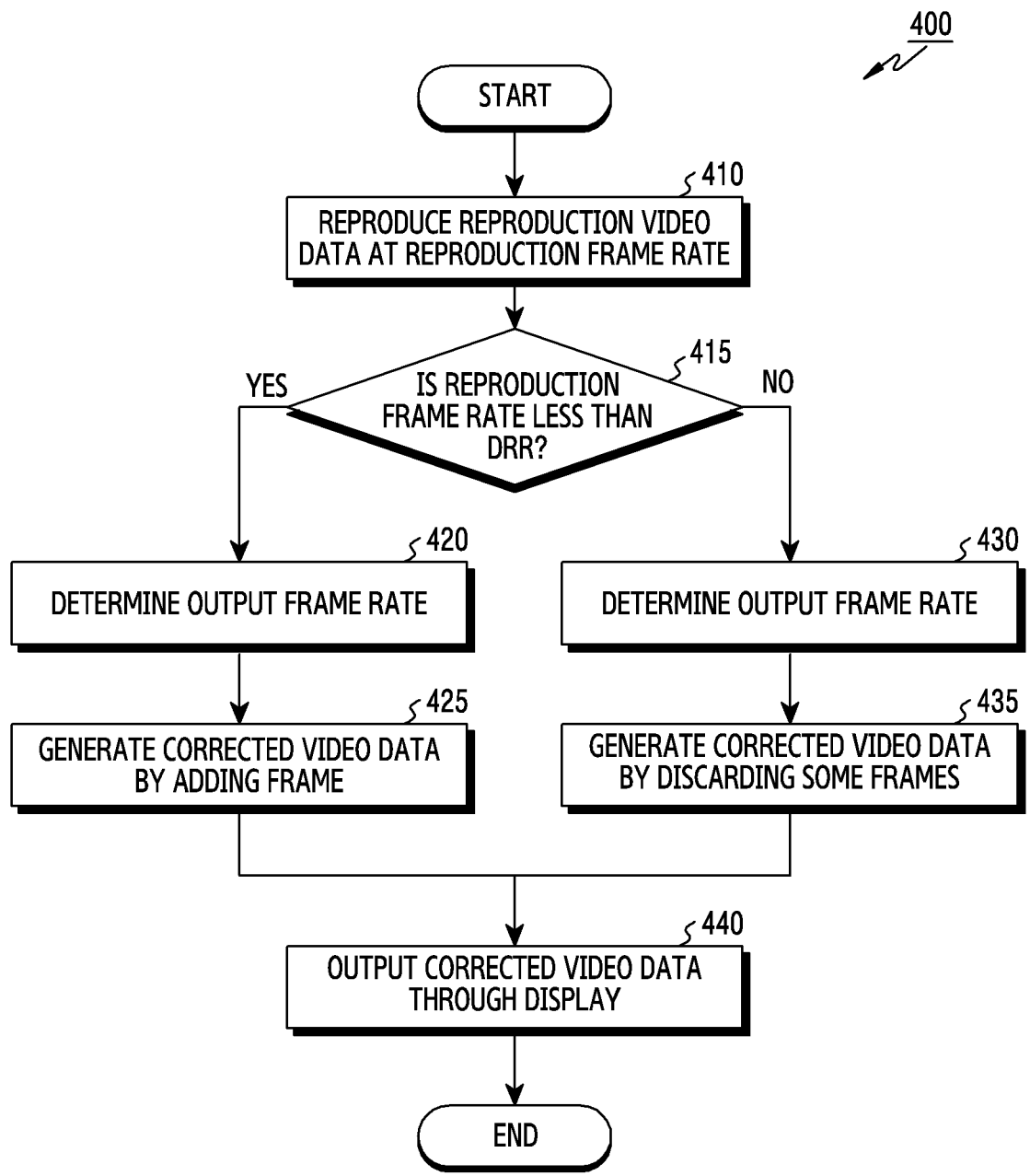
FIG. 4 is a flowchart illustrating a process in which an electronic device reproduces video data, based on a reproduction frame rate and a display refresh rate, according to an embodiment of the disclosure.

Referring to FIG. 2, a structure of the electronic device, and components included in the electronic device 101 are not limited to those illustrated in FIG. 4. For example, components of the electronic device 101 illustrated in FIG. 2 may be replaced with other components, or additional components may be included in the electronic device 101. For example, the electronic device 101 according to various embodiments may further include a camera 240 (e.g., the camera module 180 of FIG. 1). For another example, the processor 220 of the electronic device 101 according to various embodiments may be replaced to process data by a device external to the electronic device 101 using a cloud computing technology and to control the components of the electronic device 101.

According to various embodiments, the processor 220 may execute instructions loaded into the memory 210 to control the operation of the components (e.g., the display 230) of the electronic device 101. The processor 220 may execute instructions included in software to control at least one other component connected to the processor 220. The processor 220 may obtain instructions and interpret the obtained instructions to process data or perform an operation. It may be understood that the operation of the electronic device 101 referred to in this document is performed by the processor 220 executing an instruction.

The display 230 may visually display (which may be referred to as presenting or outputting) an image. For example, the processor 220 of the electronic device 101 may display a screen that reproduces a video file stored in the memory 210 or a video stream received from the outside through the display 230. The memory 210 according to various embodiments may temporarily or non-temporarily store various data used by components of the electronic device 101.

The processor 220 according to various embodiments may transmit a frame (image frame) included in the video data to the display in order to reproduce the video data. The processor 220 may transmit a frame to the display at every cycle according to a frame rate of frames included in the original video data and a reproduction configuration for reproducing the video data. The frame rate may be, for example, frames per second. In this document, the video content may be referred to as meaning content included in original video data such as a video file or a video stream. In this document, reproduction video data may be referred to as meaning data including an image frame transmitted to reproduction video content. In this document, a frame rate indicating the number of frames included per unit time (e.g., 1 second) in original video data may be referred to as a content frame rate. In this document, a frame rate indicating the number of frames of video data reproduced per unit time as original video data is reproduced according to a reproduction setting may be referred to as a reproduction (playback) frame rate. For example, when the frame rate of the original video data is 48 fps (frame per second) and the reproduction speed configured to reproduce the video data is ½ times, the content frame rate may be 48 fps and the reproduction frame rate may be 24 fps.

The display 230 may update a screen displayed on the display according to a display refresh rate (DRR). For example, when the display refresh rate is 60 Hz (hertz), the display 230 may update the screen 60 times in 1 second.

When the reproduction frame rate and the display refresh rate do not match, the processor 220 of the electronic device 101 may change the frame rate of the video data and transmit the same to the display 230. For example, when the reproduction frame rate is 96 fps and the display refresh rate of the display 230 is 60 Hz, the processor 220 may discard some frames from the video data, generate modified video data having a frame rate of 60 fps, and transmit the modified video data to the display 230. In this document, the term discarding some frames is referred to as meaning excluding from frames transmitted to a display for displaying video data, or ignoring frames so as not to perform processing operations performed to display the frames. The term discarding some frames should not be construed as limiting to deleting frames from the original content. As another example, when the reproduction frame rate is 24 fps and the display refresh rate of the display 230 is 60 Hz, the processor 220 may generate modified video data having a frame rate of 60 fps (or 30 fps) by adding a frame to the video data, and transmit the modified video data to the display 230. In this document, the frame rate of the modified video data transmitted to the display 230 may be referred to as an output frame rate or an adapted frame rate. For example, the output frame rate may mean a frame rate of image data output by a reproduction system or a synthesizer.

Figure 3:
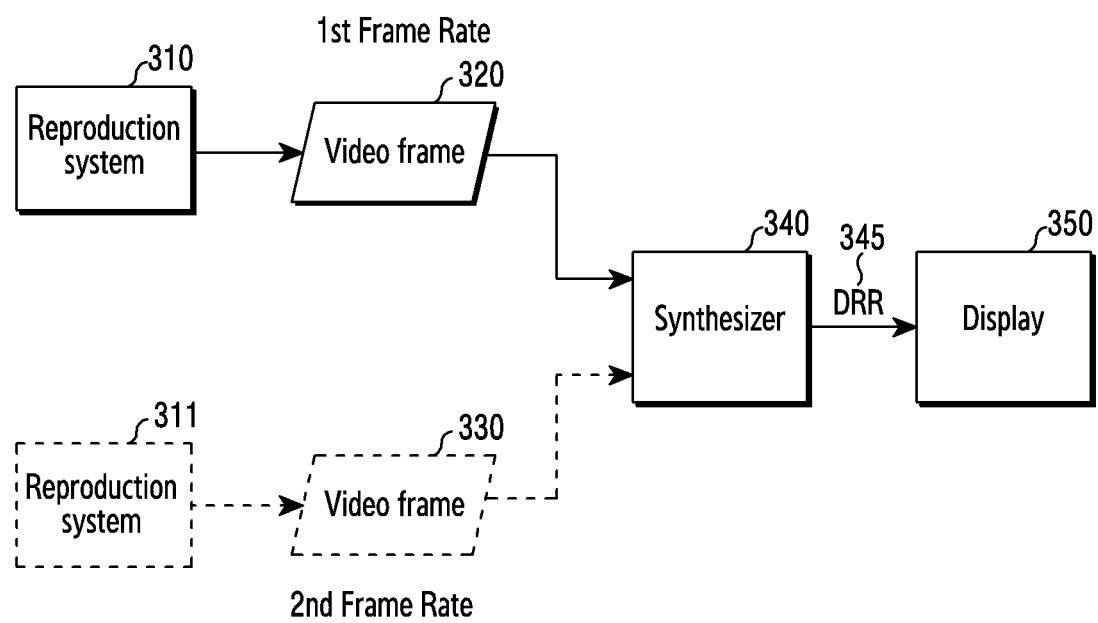
FIG. 3 is a diagram illustrating a process in which an electronic device reproduces video data and outputs the video data through a display according to an embodiment of the disclosure.

FIG. 3 is a diagram illustrating a process in which an electronic device reproduces video data and outputs the video data through a display according to an embodiment of the disclosure.

The processor of the electronic device may execute reproduction systems 310 and 311 to provide a frame of video data to a display 350 to be output. When a plurality of video contents are reproduced by the reproduction systems 310 and 311, the processor of the electronic device may display an image generated by synthesizing each frame of a plurality of video contents through the synthesizer 340 through the display 350. The reproduction systems 310 and 311 and the synthesizer 340 of FIG. 3 are components expressed to explain the functions of the electronic device, and do not have to be distinguished in terms of hardware.

When the electronic device reproduces a first video frame 320, the reproduction system 310 may output the first video frame 320, based on a configuration (e.g., a reproducing state) for playing the first video content. For example, when the first video frame 320 is 24 fps and the reproduction speed is 2×, the reproduction system 310 may output the first video frame 320, based on the reproduction frame rate of 48 fps. However, when the display refresh rate 345 at which the display 350 can display a screen is not synchronized with the reproduction frame rate, the synthesizer 340 may process a frame that has not been updated and displayed on the display 350, or the previous frame may be displayed as it is because there is no frame to be updated even though the display 350 may be updated.

Referring to FIG. 3, when two video contents are reproduced, the reproduction systems 310 and 311 may transmit the first video frame 320 of the first video content and a second video frame 330 of a second video content to the synthesizer 340. Here, the first video frame 320 may be transmitted to the synthesizer 340 at every cycle according to the reproduction frame rate of the first video content, and the second video frame 330 may be transmitted to the synthesizer 340 at every cycle according to the reproduction frame rate of the second video content. The synthesizer 340 may synthesize the frames and transmit the frames to the display 350 whenever a frame is received from the reproduction system 310. Here, the display 350 may update the screen according to the display refresh rate 345 of the display 350.

Here, when the reproduction frame rate of at least one video content is higher than the display refresh rate 345, although some of the reproduction frames of the video content are not output to the screen displayed through the display 350, the synthesizer 340 may operate to generate an image by synthesizing the frames that are not displayed. Conversely, when the display refresh rate is higher than the reproduction frame, although the display 350 can update the screen, a new frame is not provided, so a section occurs in which the display 350 cannot update the screen as a result.

FIG. 4 is a flowchart 400 illustrating a process in which an electronic device (e.g., the electronic device of FIG. 1 or 2) reproduces video data, based on a reproduction frame rate and a display refresh rate, according to an embodiment of the disclosure.

In operation 410, the electronic device may reproduce reproduction video data according to the reproduction frame rate. For example, when video content having a content frame rate of 24 fps is reproduced at double speed, the frame of the video content may be reproduced at a speed of 48 fps.

In operation 415, the electronic device may compare the reproduction frame rate of the reproduction video data and the display refresh rate of the display on which the video content is to be output. For example, when the reproduction frame rate is 48 fps and the display refresh rate is 60 Hz, the electronic device may compare the value of the reproduction frame rate of 48 with the value of the display refresh rate of 60 to determine that the reproduction frame rate is smaller than the display refresh rate.

When it is determined that the reproduction frame rate is smaller than the display refresh rate, in operation 420, the electronic device may determine an output frame rate, based on the display refresh rate. In operation 420, the electronic device may determine the output frame rate as a value greater than the reproduction frame rate. According to an embodiment, the electronic device may determine the output frame rate as the same value as the display refresh rate. According to another embodiment, the electronic device may determine the output frame rate as a value that is a divisor of the display refresh rate. For example, when the display refresh rate is 120 Hz, the electronic device may determine any one of 10 fps, 20 fps, 30 fps, 40 fps, 60 fps, or 120 fps as the output frame rate, which is the frame rate of the modified video data modified based on the display refresh rate.

According to various embodiments, in operation 420, the electronic device may determine an output frame rate, based on information on the performance of the electronic device. For example, the electronic device may determine the output frame rate, based on the interpolation performance of the electronic device. In order to determine the output frame rate, based on the interpolation performance, the electronic device may determine the maximum value among the divisors of the display refresh rate as the output frame rate within a range allowed by the interpolation performance. As a more specific example, when the display refresh rate is 60 Hz, the reproduction frame rate is 24 fps, and the range of interpolation performance is within 2 times, the electronic device may determine, as the output frame rate, 48 (reproduction frame rate X interpolation performance) or less and the largest value among divisors of 60 (display refresh rate) is 30 fps.

As another example, the output frame rate may be determined within a range allowed by the resource of the electronic device. For example, when a frame is added by interpolating a frame by an interpolator in operation 425, a resource is used to add the frame. The information on the performance of the electronic device may include information on the amount of resources (e.g., calculation amount) allowed for the operation of adding a frame. The electronic device may determine, as the output frame rate, a value that can be adjusted through an operation within an amount of resources allowed among the divisors of the display refresh rate.

In operation 425, the electronic device may generate modified video data to have the output frame rate determined in operation 420. For example, the electronic device may generate a plurality of interpolated frames by interpolating a plurality of frames included in the reproduction video data, and may generate modified video data including the generated frames. The frame rate of the modified video data may be the output frame rate determined in operation 420. The electronic device may determine the number of frames used as input to the interpolator and the number of frames output by the interpolator, based on the determined output frame rate and the reproduction frame rate. For example, the electronic device may determine a value obtained by dividing the reproduction frame rate by the greatest common divisor of the output frame rate and the reproduction frame rate as the number of frames input to the interpolator. The electronic device may determine the number of output frames in which the determined number of frames are input to the interpolator as a value obtained by dividing the output frame rate by the greatest common divisor of the output frame rate and the reproduction frame rate. As a specific example, when the output frame rate is 30 and the reproduction frame rate is 24, the electronic device may determine to output 5 frames by interpolating 4 frames. The meaning of generating the modified video data does not necessarily mean only the case of generating and storing separate data, but also the case of performing an operation of allowing frames to be transmitted to the display, based on the determined output frame rate.

When it is determined that the reproduction frame rate is not less than the display refresh rate, in operation 430, the electronic device may determine an output frame rate, based on the display refresh rate. The output frame rate may be the same value as the display refresh rate. When the output frame rate is the same as the display refresh rate, operation 430 for separately determining the output frame rate may be omitted.

In operation 435, the electronic device may transmit modified video data in which some of the frames of the reproduction video data are discarded to the display to have the output frame rate determined in operation 430 to the display.

In operation 440, the electronic device may output the modified video data generated in operation 425 or 435 through the display.

Figure 5:
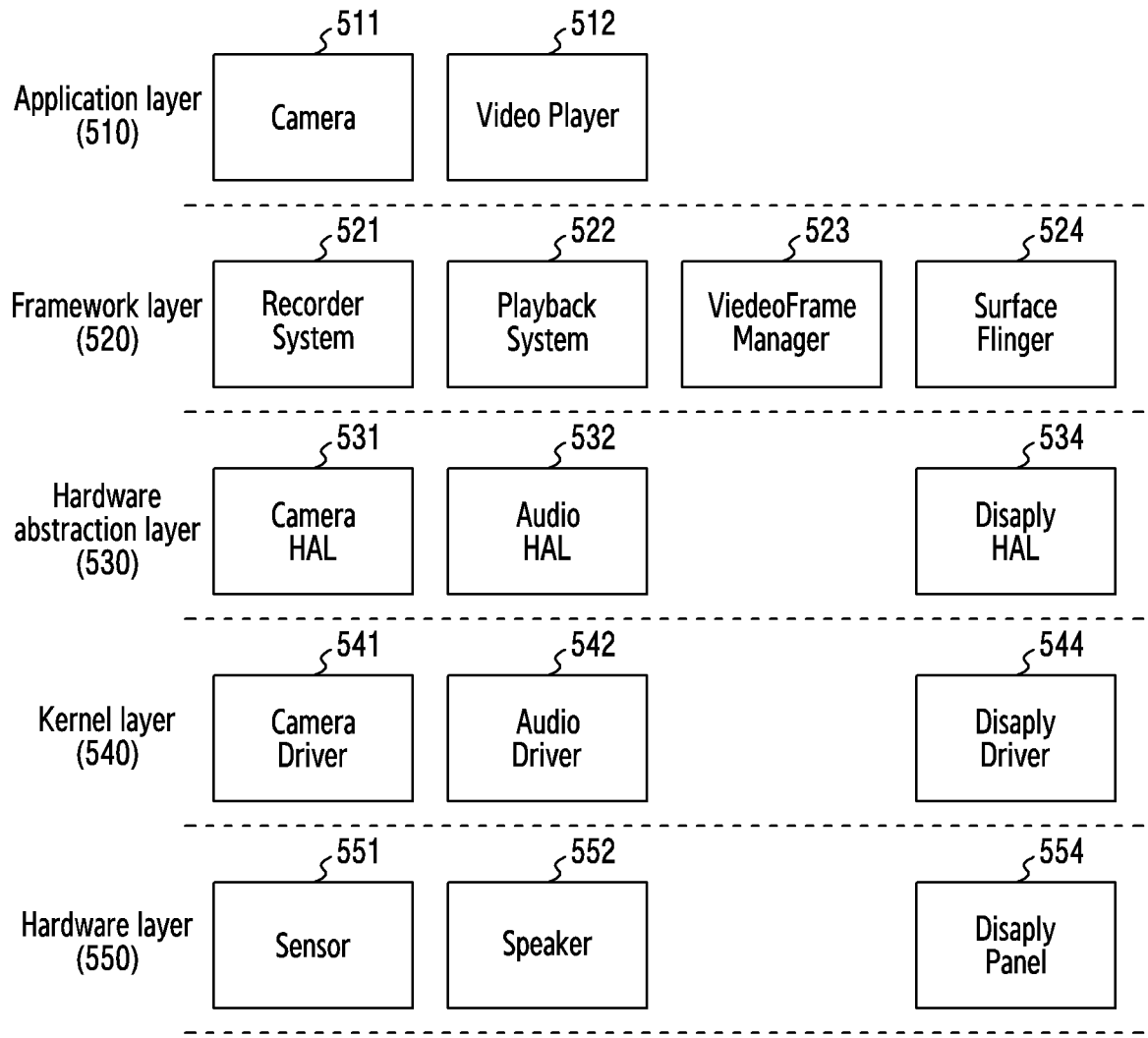
FIG. 5 is a diagram illustrating a software system architecture for an electronic device to reproduce video data, based on a reproduction frame rate and a display refresh rate, according to an embodiment of the disclosure.

FIG. 5 is a diagram illustrating a software system architecture for an electronic device (e.g., the electronic device 101 of FIG. 1 or 2) to reproduce video data, based on a reproduction frame rate and a display refresh rate, according to an embodiment of the disclosure.

The software system architecture according to various embodiments may include an application layer 510, a framework layer 520, a hardware abstraction layer 530, a kernel layer 540, and a hardware layer 550.

The electronic device according to various embodiments of the disclosure may reproduce video content by executing an application of the application layer 510. An application of the application layer 510 may be stored in a memory (e.g., the memory 130 of FIG. 1 or the memory 210 of FIG. 2) and may be executed by a processor (e.g., the processor 120 of FIG. 1 or the processor 220 of FIG. 2). For example, the electronic device may execute a camera application 511 to generate a frame (image frame) using information obtained through an image sensor included in the camera, and may output the generated frame as a preview image through a display. As another example, the electronic device may execute the video player application 512 to output a frame included in video content stored in the memory through the display.

The framework layer 520 may operate so that a function or information provided from one or more resources of the electronic device may be used by an application of the application layer 510. For example, while the electronic device records a video by executing the camera application 511, a recorder system 521 of the framework layer 520 may perform a recording function with video data and audio data transmitted through the hardware abstraction layer 530 (e.g., the camera HAL 531 and the audio HAL 532). As another example, while the electronic device plays the video content by executing the video player application 512, the playback/reproduction system 522 of the framework layer 520 may reproduce a video frame requested by the video player application 512.

The electronic device according to various embodiments may include a video frame manager 523 implemented in the framework layer 520. The video frame manager 523 may obtain a reproduction frame rate for the reproduction video data to be displayed. For example, the recording frame rate of the video content recorded from the recording system 521 may be obtained, or the reproduction frame rate of the reproduction video data reproduced from the reproduction system 522 may be obtained. The video frame manager 523 may obtain information on the display refresh rate. For example, the video frame manager 523 may obtain information on the display refresh rate through the surface flinger 524 of the framework layer 520. The video frame manager 523 may transmit the video frame to the surface flinger 524 so that modified video data having an output frame rate is output based on the obtained frame rate and information on the display refresh rate.

The surface flinger 524 of the framework layer 520 may provide an execution screen to be displayed on a display, based on execution screens generated by various applications. The surface flinger 524 may provide the functionality of the synthesizer 340 of FIG. 3. When the configuration for the display is changed, the surface flinger 524 may transmit information related to the changed configuration to the video frame manager 523.

The hardware abstraction layer (HAL) 530 may refer to an abstraction layer between a hardware module of the hardware layer 550 and software. For example, the hardware abstraction layer 530 may include at least one of a camera HAL 531 through which data for a camera is transmitted, an audio HAL 532 through which data regarding audio is transmitted, or a display HAL 534 through which data for a display is transmitted.

The kernel layer 540 may include a driver for controlling a hardware module included in the electronic device. For example, the kernel layer 540 may include at least one of a camera driver 541 for controlling the sensor 551 of the camera module, an audio driver 542 for controlling an audio module such as a microphone or speaker 552, or a display driver 544 for controlling a display panel 554 of a display.

The hardware layer 550 may include hardware constituting the electronic device. For example, the hardware layer 550 may include at least one of a sensor 551, a speaker 552, a microphone (not shown), or a display panel 554 of a camera module that receives or outputs image data or audio data.

Figure 6:
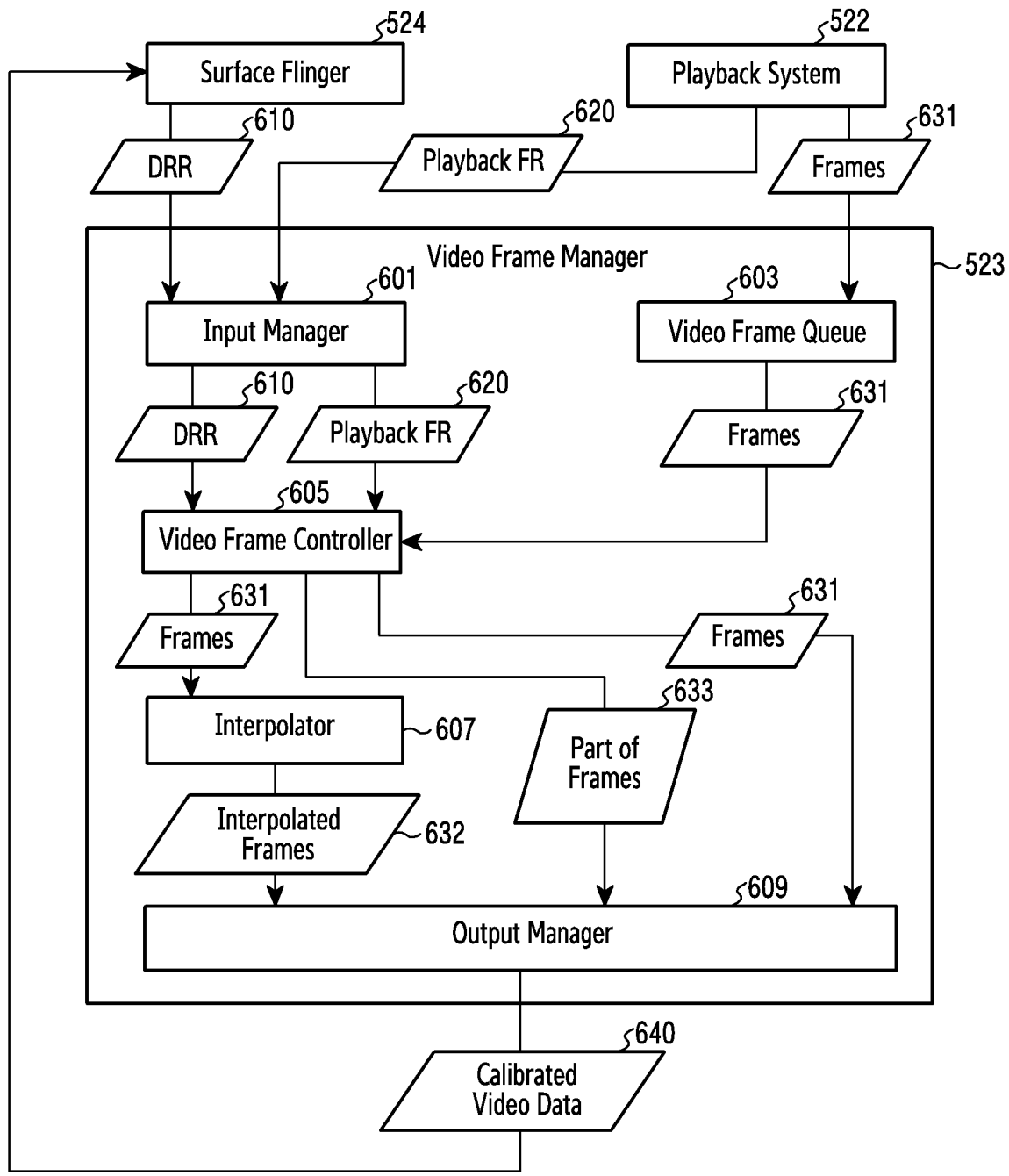
FIG. 6 is a diagram illustrating a process in which an electronic device performs an operation of a video frame manager according to an embodiment of the disclosure.

FIG. 6 is a diagram illustrating a process in which an electronic device (e.g., the electronic device of FIG. 1 or 2) performs an operation of a video frame manager 523 according to an embodiment of the disclosure.

The video frame manager 523 may include an input manager 601, a video frame queue 603, a video frame controller 605, an interpolator 607, and an output manager 609. FIG. 6 is for explaining the function of the video frame manager 523, the configuration of the video frame manager 523 is not limited to the components shown in FIG. 6. Components of the video frame manager 523 shown in FIG. 6 may be replaced with other components, or additional components may be included in the video frame manager 523. For example, the reproduction system 522 and the reproduction frame rate 620 may be replaced by the recording system and the recording frame rate. In addition, because FIG. 6 is for explaining the function of the video frame manager 523, the components shown in FIG. 6 do not have to be composed of separate hardware.

The input manager 601 may receive information necessary for the operation of the video frame manager 523 from other components, and transmit the input information to the video frame controller 605. According to various embodiments, the input manager 601 may receive information on the display refresh rate 610 from the surface flinger 524 and may receive information on the reproduction frame rate 620 from the reproduction system 522.

The video frame controller 605 may receive information on the display refresh rate 610 and the reproduction frame rate 620 received through the input manager 601. The video frame queue 603 may receive and buffer a frame 631 output from the reproduction system 522. The video frame controller 605 may determine a processing operation for the frames 631 stored in the video frame queue 603, based on information on the display refresh rate 610 and the reproduction frame rate 620. For example, when in a case of an unnecessary frame that is not displayed, the video frame controller 605 may perform at least one of a discard operation of discarding a frame, a transfer operation of outputting the frame as it is, or an addition operation of adding a frame to improve the frame rate.

When the display refresh rate 610 and the reproduction frame rate 620 are the same, the video frame controller 605 may output the frames 631 through the output manager 609 as it is. The video frame controller 605 may input frames 631 to the interpolator 607 when the reproduction frame rate 620 is lower than the display refresh rate 610. The interpolator 607 may generate interpolated frames 632 through interpolation processing on the input frames 631. The interpolated frames 632 may be output through the output manager 609. According to various embodiments, the interpolated frames 632 may be output through the output manager 609 together with a portion of the frames 631 used for interpolation. When the reproduction frame rate 620 is higher than the display refresh rate 610, the video frame controller 605 may determine an unnecessary frame from among the frames 631, and output a portion 633 of frames excluding unnecessary frames through the output manager 609.

The output manager 609 may transmit the modified video data 640 including the frames 631, the interpolated frames 632, or the portion 633 of frames to the surface flinger 524 so that the modified video data 640 is output through the display. According to various embodiments, the video frame controller 605 and the interpolator 607 may operate asynchronously. When the video frame controller 605 and the interpolator 607 operate asynchronously, the output manager 609 may store the received frames in a separate video frame queue, rearrange them according to the actual output order of the received frames, and output the frames in the rearranged order.

Figure 7:
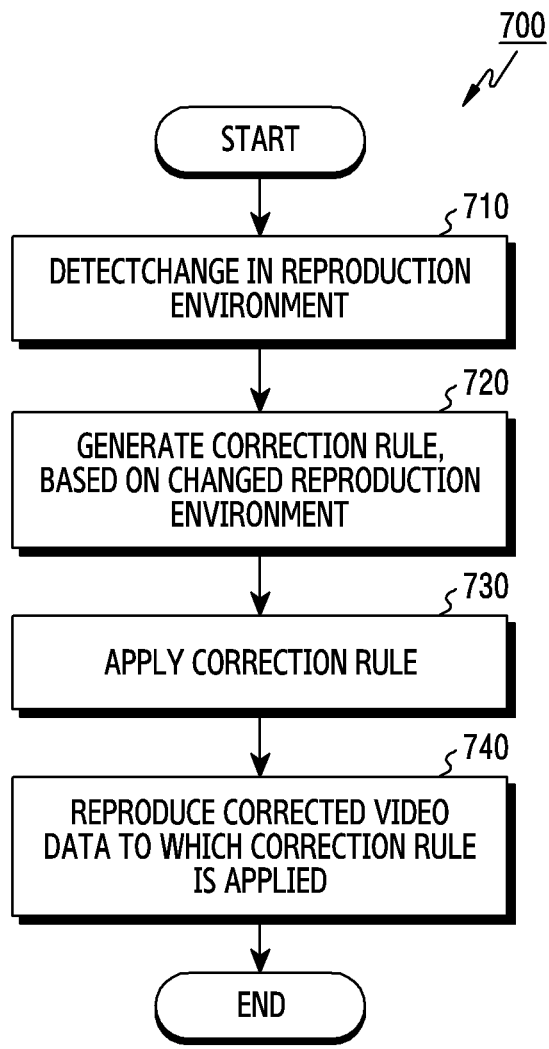
FIG. 7 is a flowchart illustrating a process in which an electronic device displays a frame of video data according to an embodiment of the disclosure.

FIG. 7 is a flowchart 700 illustrating a process in which an electronic device (e.g., the electronic device 101 of FIG. 1 or 2) displays a frame of video data according to an embodiment of the disclosure.

The electronic device may perform operation 710 of detecting whether there is a change in the reproduction environment for reproducing the video content. According to various embodiments, when at least one of the reproduction frame rate and the display refresh rate is changed, the electronic device may determine that there is a change in the reproduction environment. For example, when the reproduction speed for reproducing the video content is changed or the reproduction of the video content is paused, the electronic device may determine that a change in the reproduction environment has occurred.

The electronic device may perform operation 720 of generating a correction rule, based on the changed reproduction environment. When at least one of the reproduction frame rate and the display refresh rate is changed due to a change in the reproduction environment, the electronic device may generate a correction rule, based on at least one of the changed reproduction frame rate and the changed display refresh rate. For example, when the value of the reproduction frame rate is smaller than the value of the display refresh rate, the electronic device may perform an operation of generating a frame interpolation rule for generating an interpolated frame through interpolation processing on the frames. As another example, when the value of the reproduction frame rate is greater than or equal to the value of the display refresh rate, the electronic device may perform an operation of generating a frame discarding rule.

The electronic device may perform operation 730 of applying the generated correction rule, based on the changed reproduction environment. For example, when there is a new video frame, the electronic device may determine a processing operation for the new video frame by comparing the reproduction frame rate with the display refresh rate. When the value of the reproduction frame rate is smaller than the value of the display refresh rate, the electronic device may determine whether interpolation processing for the frame is required based on a frame interpolation rule. When it is determined that frame interpolation is necessary, the electronic device may perform an operation of generating an interpolated frame through interpolation processing on the frame. When the value of the reproduction frame rate is greater than or equal to the value of the display refresh rate, the electronic device may perform an operation of determining whether to discard the frame, based on the frame discard rule. When it is determined that the new video frame is to be discarded, the electronic device may perform an operation of skipping the new video frame without outputting the same.

In operation 730, the electronic device may perform operation 740 of playing the modified video data to which the correction rule is applied. For example, when an interpolated frame is generated, the electronic device may output the generated frame, or when some frames are to be discarded, the electronic device may output the remaining frames except for some frames.

Figure 8:
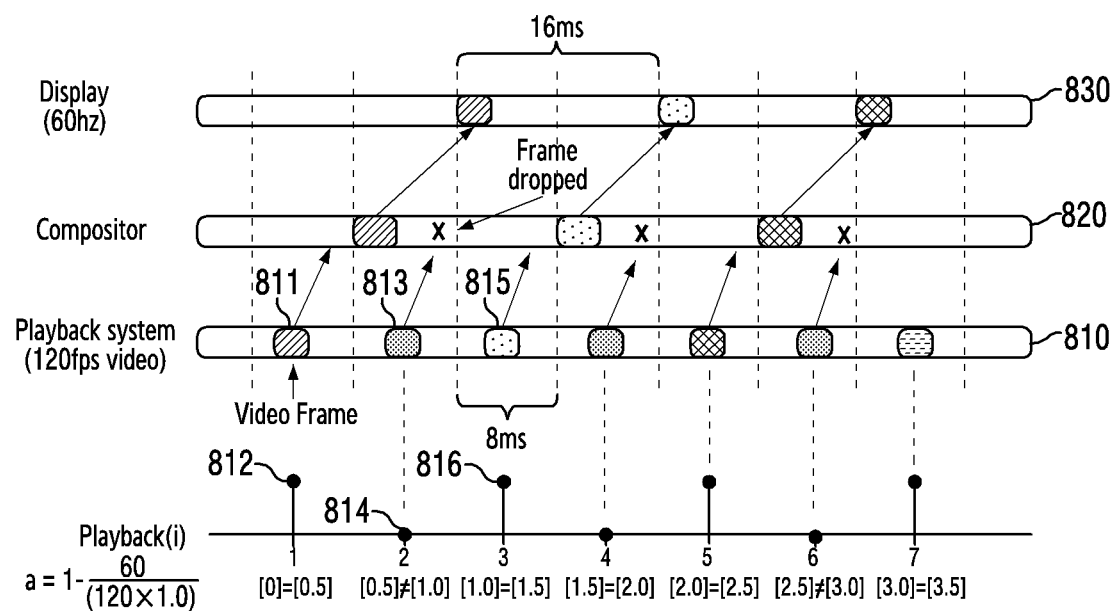
FIG. 8 is a diagram conceptually illustrating an example of an operation of displaying, by an electronic device, modified video data in which some of frames of video data are discarded, according to an embodiment of the disclosure.

FIG. 8 is a diagram conceptually illustrating an example of an operation of displaying, by an electronic device (e.g., the electronic device 101 of FIG. 1 or 2), modified video data in which some of frames of video data are discarded, according to an embodiment of the disclosure.

FIG. 8 illustrates reproduction video data 810 having a reproduction frame rate of 120 fps including frames output from a reproduction system, modified video data 820 including frames transmitted to a synthesizer, and frames 830 displayed on a display with a display refresh rate of 60 Hz.

The electronic device according to various embodiments may use the ratio value a to determine whether to reproduce or discard the $i^{th}$ frame. The ratio value a may be determined based on a display refresh rate, a content frame rate, and a reproduction rate (i.e., a reproduction frame rate).

$$\alpha = 1 - \frac{\text{(display refresh rate)}}{\text{(content frame rate)} \times \text{(playback rate)}} \quad \text{Equation 1}$$

The electronic device may determine whether to reproduce the frame, based on the function playback(i) for determining whether to reproduce the $i^{th}$ frame. Here, i means the frame number (or index) of the frame.

$$\text{playback } (i) = \begin{cases} 1, \lfloor \alpha \times (i-1) \rfloor = \lfloor \alpha \times i \rfloor \\ 0, \lfloor \alpha \times (i-1) \rfloor < \lfloor \alpha \times i \rfloor \end{cases} \quad \text{Equation 2}$$

The electronic device may perform an operation for outputting a screen including the $i^{th}$ frame when the value of the function playback(i) is 1, and may not perform the operation when the value of the playback(i) is 0.

Referring to FIG. 8, because the value of the display refresh rate is 60 and the value of the reproduction frame rate is 120 (120(content frame rate)×1 (reproduction speed)), the value 812 of the function playback(i) for the first frame 811 is one. Accordingly, the first frame 811 may be transmitted to the synthesizer and transmitted to the display through the synthesizer to be displayed as an updated screen.

The value 814 of the function playback(i) for the second frame 813 becomes zero. Thus, the second frame 813 is not passed to the synthesizer. That is, because the time at which the second frame 813 is reproduced after the first frame 811 is reproduced is a time point at which only 8 ms has elapsed before the elapse of 16 ms, which is a period during which the screen is updated according to the display refresh rate, the electronic device may skip at least a part of the operation for displaying the second frame 813.

Because the value 816 of the function playback(i) for the third frame 815 is 1, the third frame 815 may be transmitted to the synthesizer and transmitted to the display through the synthesizer to be displayed as an updated screen.

Accordingly, because the frames included in the modified video data 820 transmitted to the synthesizer coincide with the frames 830 displayed on the display, it is possible to prevent the synthesizer from performing an operation for processing unnecessary frames.

Figure 9:
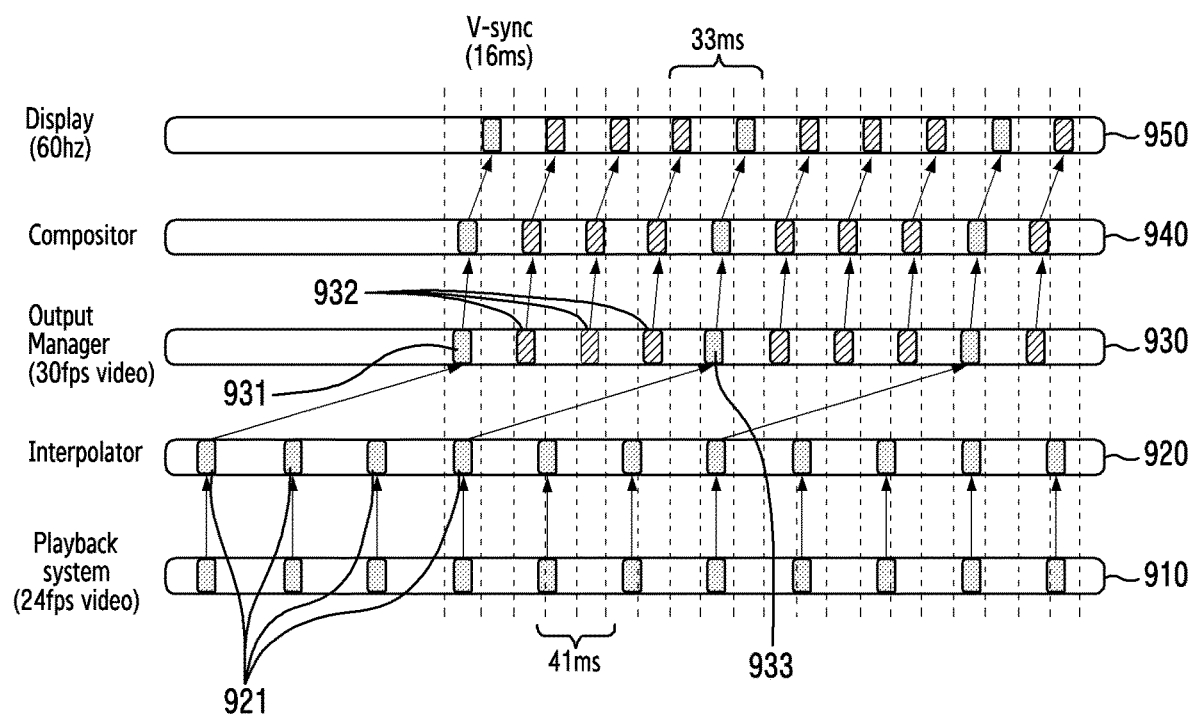
FIG. 9 is a diagram conceptually illustrating an example of an operation in which an electronic device displays modified video data to which a frame is added, according to an embodiment of the disclosure.

FIG. 9 is a diagram conceptually illustrating an example of an operation in which an electronic device (e.g., the electronic device 101 of FIG. 1 or 2) displays modified video data to which a frame is added, according to an embodiment of the disclosure.

FIG. 9 illustrates reproduction video data 910 having a reproduction frame rate of 24 fps including frames output from a reproduction system, frames 920 input to an interpolator, modified video data 930 including frames generated through the interpolator, frames 940 input to the synthesizer, and frames 950 displayed on a display with a display refresh rate of 60 Hz.

When the reproduction frame rate is 24 fps, the display refresh rate is 60 Hz, and the limit of the interpolation performance of the electronic device is doubled, the output frame rate may be determined to be 30 fps. In order to generate the modified video data 930 having an output frame rate of 30 fps from the reproduction video data 910 having a reproduced frame rate of 24 fps, the electronic device may configure five frames from four frames. Referring to FIG. 9, the electronic device may generate three frames 932 by inputting four frames 921 of the reproduction video data 910 to the interpolator. The electronic device may output modified video data 930 including the best frame 931 among the three frames 932 and the four frames 921 obtained through interpolation processing and five frames 931, 932, 933 including the last frame 933.

Referring to FIG. 9, because the frames included in the modified video data 930 and frames output through the display match, video frames capable of maximizing the display refresh rate of the display may be output.

Figure 10:
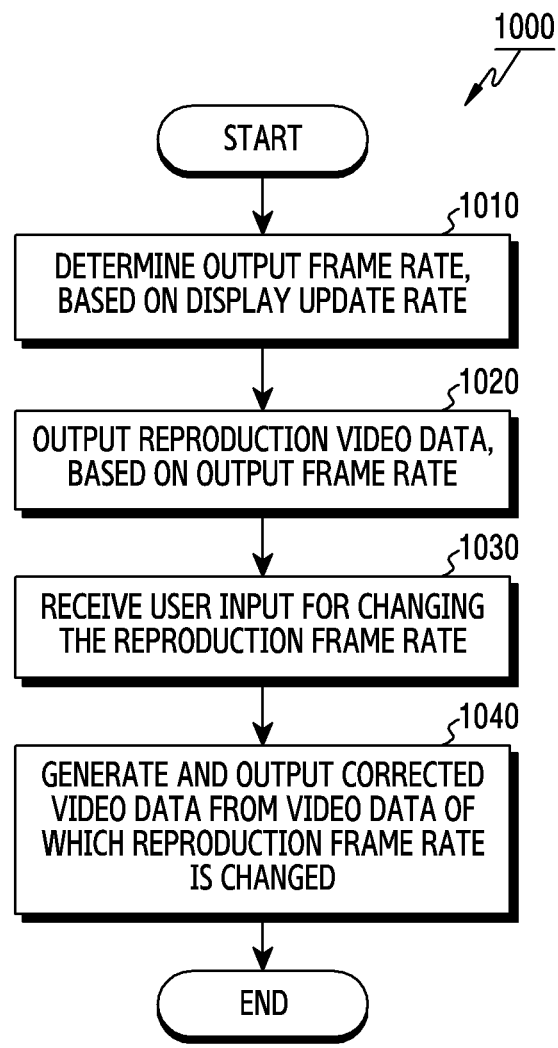
FIG. 10 is a flowchart illustrating a process in which an electronic device displays video data, based on a user input, according to an embodiment of the disclosure.

FIG. 10 is a flowchart 1000 illustrating a process in which an electronic device (e.g., the electronic device 101 of FIG. 1 or 2) displays video data, based on a user input, according to an embodiment of the disclosure.

The electronic device may perform operation 1010 of determining an output frame rate of the output video data, based on the display refresh rate of the display on which the video content is to be output. For example, the electronic device may determine an output frame rate of the output video data by performing at least one of operations 410, 415, 420, and 430 of FIG. 4. In addition, the electronic device may perform operation 1020 of outputting reproduction video data, based on the determined output frame rate. For example, the electronic device may generate modified video data to have an output frame rate from the reproduction video data, and output the modified video data.

The electronic device may perform operation 1030 of receiving a user input for changing the reproduction frame rate of the reproduction video data being reproduced. For example, when the electronic device includes a touch screen, the electronic device may receive a touch input for a position where an icon for changing the reproduction speed of the reproduction video data is displayed.

In response to a user input for changing the reproduction frame rate, the electronic device may perform operation 1040 of generating and outputting modified video data from the video data of which the reproduction frame rate is changed. For example, when the reproduction speed of the reproduction video is changed while the image is being output based on modified video data in which some frames are discarded from the reproduction video data, the electronic device may determine the ratio value a again, based on the reproduction frame rate changed due to the change in the reproduction speed, and again determine the value of the function playback(i) for each frame, based on the changed ratio value. For another example, when the reproduction frame rate of the reproduction video data is transitioned to a state in which the reproduction frame rate of the reproduction video data is lower than the display refresh rate while discarding and displaying some frames of the reproduction video data having a reproduction frame rate higher than the display refresh rate, the electronic device may change a processing method of frames included in the reproduction video data to a method of adding frames by interpolating the frames.

Figure 11:
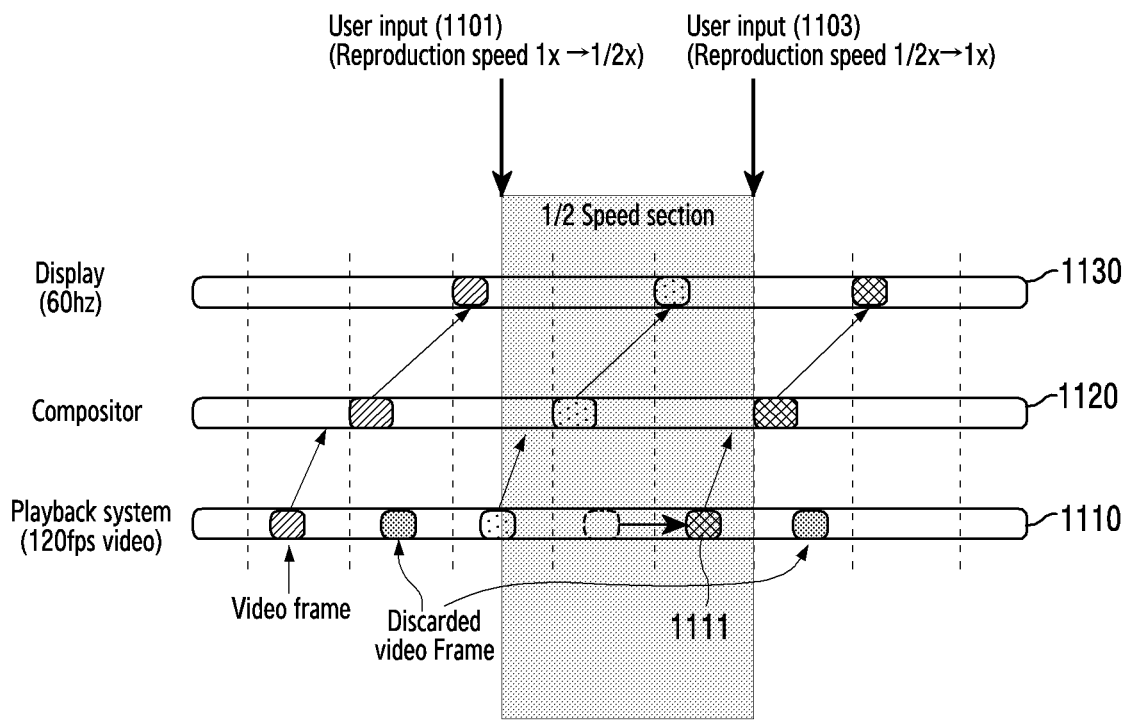
FIG. 11 is a diagram conceptually illustrating an example in which an electronic device displays video data in response to a user input for changing a reproduction frame rate of video data, according to an embodiment of the disclosure.

FIG. 11 is a diagram conceptually illustrating an example in which an electronic device (e.g., the electronic device 101 of FIG. 1 or 2) displays video data in response to a user input for changing a reproduction frame rate of video data, according to an embodiment of the disclosure.

Referring to FIG. 11, reproduction video data 1110 output from a reproduction system, modified video data 1120 including frames input to a synthesizer, and frames 1130 output through a display. In particular, FIG. 11 shows an example of changing the reproduction speed of video content having a content frame rate of 120 fps from 1× to ½× (user input 1101) and then again to 1× (user input 1103) through a display having a display refresh rate of 60 Hz.

In a state in which video content is being reproduced at 1× speed before the user input 1101 is received, the electronic device may not perform at least a part of an operation for displaying the discarded frames by discarding some frames of the reproduction video data. In this state, when a user input 1101 for changing the reproduction speed from 1× to ½× is received, the speed at which a frame included in the reproduction video data is output is reduced. Accordingly, the output point of the frame 1111 included in the reproduction video data is changed, and the reproduction frame rate is reduced to 60 fps while the reproduction video data is reproduced at ½ speed. Therefore, when the video content is reproduced at 1× speed, the frame 1111 to be discarded should be displayed without being discarded. Accordingly, when the reproduction speed of the reproduction video content is changed, the electronic device may determine a processing method for frames included in the reproduction video data 1110 again, based on the changed reproduction frame rate.

Figure 12:
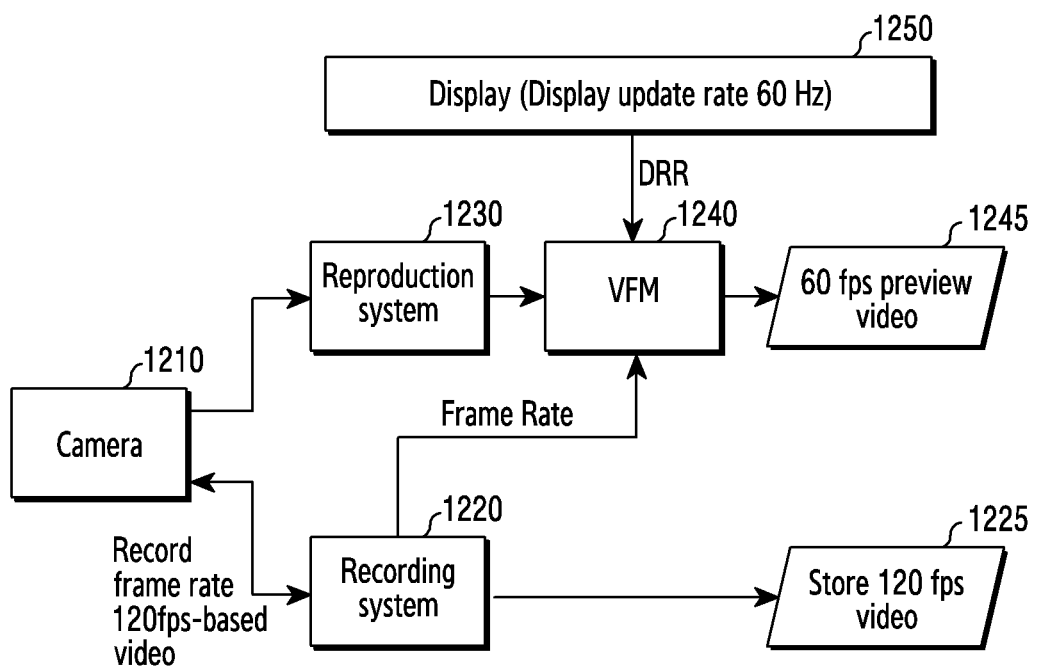
FIG. 12 is a diagram illustrating an operation of displaying a preview image while an electronic device records video data, according to an embodiment of the disclosure.

FIG. 12 is a diagram illustrating an operation of displaying a preview image while an electronic device (e.g., the electronic device 101 of FIG. 1 or 2) records video data, according to an embodiment of the disclosure.

When a video is recorded based on image data obtained through a camera 1210 (e.g., the camera module 180 of FIG. 1 and the camera 240 of FIG. 2), the electronic device may display a preview image 1245 of the recorded video on a display 1250 to check the recorded video. The image frame obtained through the camera 1210 may be transmitted to the video frame manager 1240 through the reproduction system 1230. When a recording system 1220 is recording a 120 fps image, an image frame may be obtained at a frame rate of 120 fps through the camera 1210.

When the display refresh rate of the display 1250 is 60 Hz, all the image frames obtained at 120 fps cannot be reflected on the screen updated on the display, so that a video frame manager 1240 may generate the preview image 1245, based on information about a frame rate of a recorded video obtained from the recording system 1220 and information about a display refresh rate on the display 1250. For example, the electronic device may generate a preview image having a frame rate of 60 fps corresponding to the display refresh rate and output the preview image through the display 1250.

The recording system 1220 may store a video 1225 having a frame rate of 120 fps according to a recording configuration. According to various embodiments, while the electronic device executes a camera application and records a video, the frame rate of the stored video may be changed. For example, the electronic device may receive a user input that causes the electronic device to change a frame rate for video recording. When the frame rate of the video is changed while the video is being recorded, the video frame manager 1240 of the electronic device may output a preview image 1245, based on the changed frame. For example, when the frame rate of a video recorded by the recording system 1220 is changed from 120 fps to 24 fps, the video frame manager 1240 may generate a preview image of 30 fps from video data recorded at 24 fps and output it through the display 1250.

Figure 13:
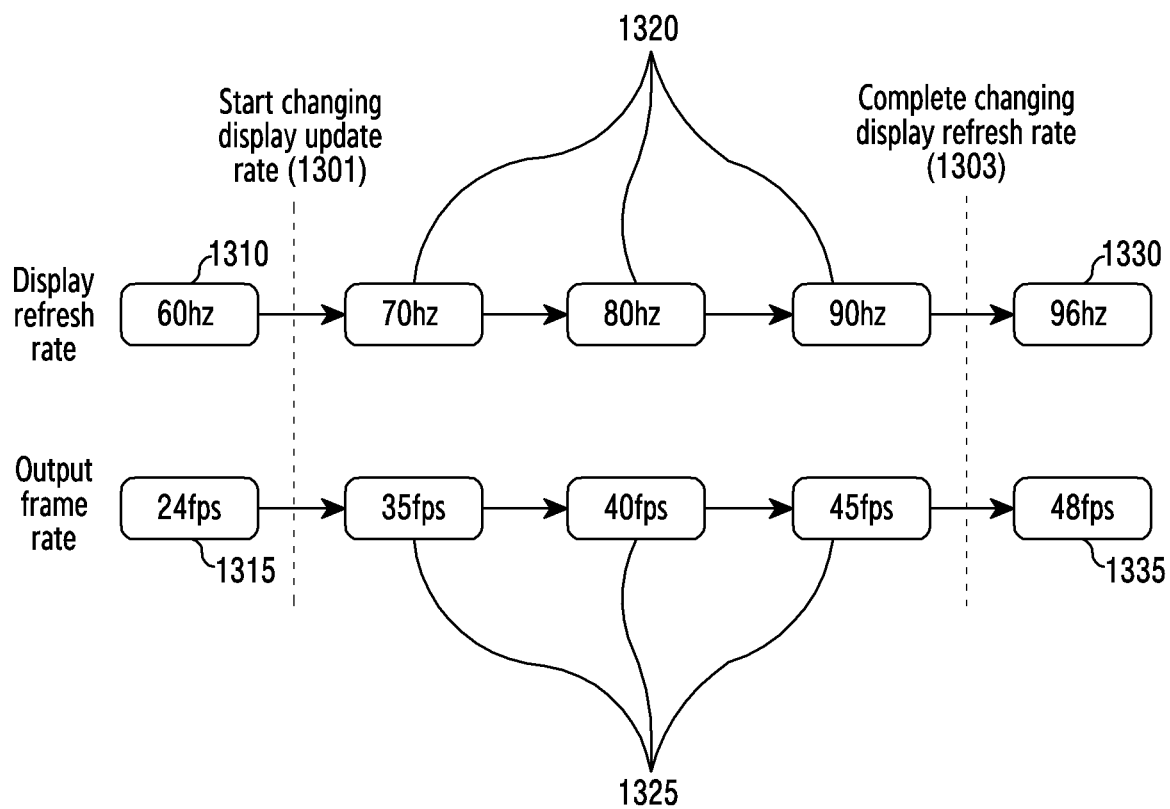
FIG. 13 is a diagram illustrating an operation of displaying video data by an electronic device in a process of changing a display refresh rate of a display according to an embodiment of the disclosure.

FIG. 13 is a diagram illustrating an operation of displaying video data by an electronic device (e.g., the electronic device 101 of FIG. 1 or 2) in a process of changing a display refresh rate of a display (e.g., the display module 160 of FIG. 1 or the display 230 of FIG. 2) according to an embodiment of the disclosure.

Depending on the capabilities of the display, the display may support multiple display refresh rates. In order to solve a problem caused by a sudden change in the display refresh rate of the display during operation of the display, when the refresh rate of the display is changed from a first frequency 1310 to a second frequency 1330, the display may operate at an intermediate frequency 1320 between the point 1301 at which the change of the display refresh rate starts and a point 1303 at which the change in the display refresh rate is completed.

Here, the electronic device may output video data, based on the intermediate frame rate 1325 in the process of changing from the state in which video data is output based on the first output frame rate 1315 corresponding to the first frequency 1310 to the second output frame rate 1335 according to the change of the display refresh rate.

Figure 14:
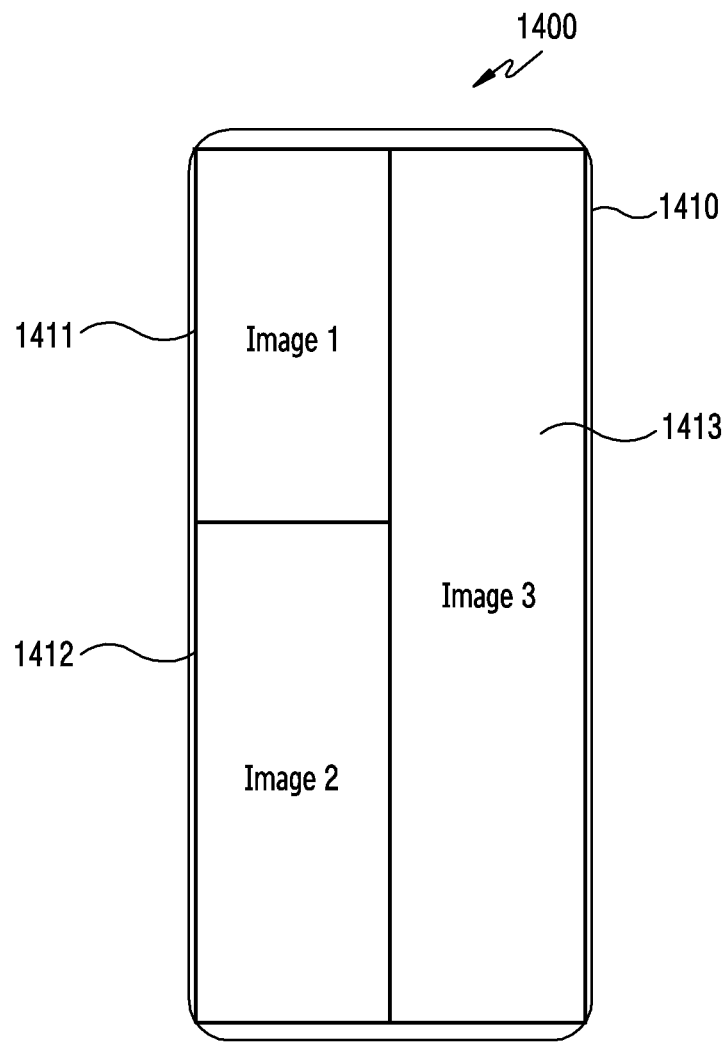
FIG. 14 is a diagram illustrating an example of determining an output frame rate to display a plurality of video data according to an embodiment of the disclosure.

FIG. 14 is a diagram illustrating an example of determining an output frame rate to display a plurality of video data according to an embodiment of the disclosure.

An electronic device 1400 (e.g., the electronic device 101 of FIG. 1 or 2) according to various embodiments may display a plurality of video contents on a display 1410. For example, the electronic device 1400 may display a plurality of video contents and a screen displayed in each pop-up window. Referring to FIG. 14, the electronic device may display a screen on which image contents are displayed, respectively, in regions within the display divided into a plurality of windows 1411, 1412, and 1413. A plurality of video contents displayed on one display 1410 may be reproduced based on different reproduction frame rates. For example, a first video content displayed in the first window 1411 may be played based on a reproduction frame rate of 24 fps, a second video content displayed in the second window 1412 may be reproduced based on 30 fps, and a third video content displayed in the third window 1413 may be reproduced based on 60 fps. However, the images displayed on the windows 1411, 1412, and 1413 in the display of the electronic device 1400 are not limited to images of video content. Different types of content may be reproduced in the windows 1411, 1412, and 1413 at different frame rates, respectively. For example, a web page displayed by an Internet browser in which frames are generated at a cycle of 60 fps may be displayed in the first window 1411, a screen of game content in which frames may be generated at a cycle of 120 fps may be displayed on the second window 1412, and video content reproduced at a cycle of 24 fps may be displayed on the third window 1413.

The electronic device may determine an output frame rate for each of the plurality of video windows 1411, 1412, and 1413, based on the display refresh rate of the display 1410, and may display a plurality of video contents (or other contents). For example, when the display refresh rate of the display 1410 is 96 Hz, the electronic device may configure and reproduce the first video content displayed in the first window as modified video data having an output frame rate of 48 fps, may configure and reproduce the second video content displayed on the second window 1412 as modified video data having an output frame rate of 48 fps, and may configure and reproduce the third video content displayed on the third window 1413 as modified video data having an output frame rate of 96 fps.

Figure 15:
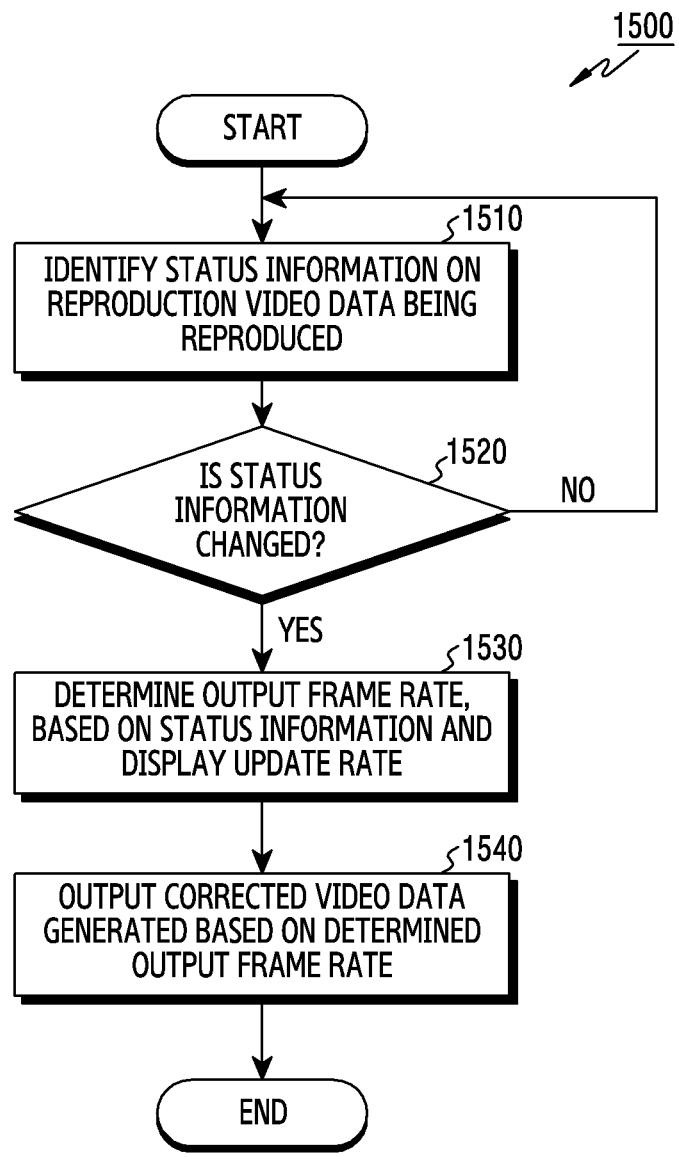
FIG. 15 is a flowchart illustrating a process of reproducing video data, based on status information related to video data being reproduced, according to an embodiment of the disclosure.

FIG. 15 is a flowchart 1500 illustrating a process in which an electronic device (e.g., the electronic device 101 of FIG. 1 or 2) reproduces video data, based on status information related to video data being reproduced, according to an embodiment of the disclosure.

The electronic device may perform operation 1510 of identifying status information on the reproduction video data being reproduced. The status information on the reproduction video data may include at least one of content information and reproduction information. The content information may include information on the content of the original video data. The content information may include, for example, at least one of a content frame rate, a content resolution, and a content type. The reproduction information may include, for example, at least one of information about a reproduction speed or a reproduction state (e.g., information indicating that reproduction or pause is in progress). The electronic device according to various embodiments may determine a processing method and an output frame rate for a frame included in the reproduction video data, based on status information on the reproduction video data. The electronic device may output the reproduction video data through the display based on the determined processing method and the output frame rate.

The electronic device may perform operation 1520 of determining whether the status information for the reproduction video data has been changed. The status information may refer to information that is a basis for determining an output frame rate for outputting reproduction video data. For example, in operation 1520, the electronic device may determine whether the video content is changed from being played to a paused state by a user input. As another example, in operation 1520, the electronic device may determine whether the content type of the video content being reproduced is changed from a normal video to an advertisement video. As further another example, when the video content includes a variable frame rate video having a plurality of sections having different content frame rates, the reproduction frame rate of the reproduction video data may be changed during the video reproduction. In this case, the reproduction information may include information on the reproduction frame rate. In operation 1520, the electronic device may determine whether the reproduction frame rate is changed according to a change in a section including the reproduction position of the reproduction video data. As another example, when a video is played based on an adaptive streaming service, a data source providing video data may be changed during video reproduction. In this case, the reproduction information may include information about the data source. In operation 1520, the electronic device may determine whether a data source providing video data has been changed.

When the status information for the reproduction video data is changed, the electronic device may perform operation 1530 of determining a changed output frame rate, based on the changed status information and the display refresh rate of the display. The electronic device may perform operation 1540 of outputting the modified video data generated based on the changed output frame rate through the display.

In various embodiments, because an operation is required to perform an operation of generating the modified video data (e.g., an operation of generating an interpolated frame), a system resource of the electronic device is used. Accordingly, in order to determine the output frame rate, based on the status information of the reproduction video data, the output frame rate may be determined using information on the system resource (which may be referred to as "performance information") of the electronic device. That is, the electronic device may determine a method of processing frames within a range allowed by the system performance of the electronic device.

Figure 16:
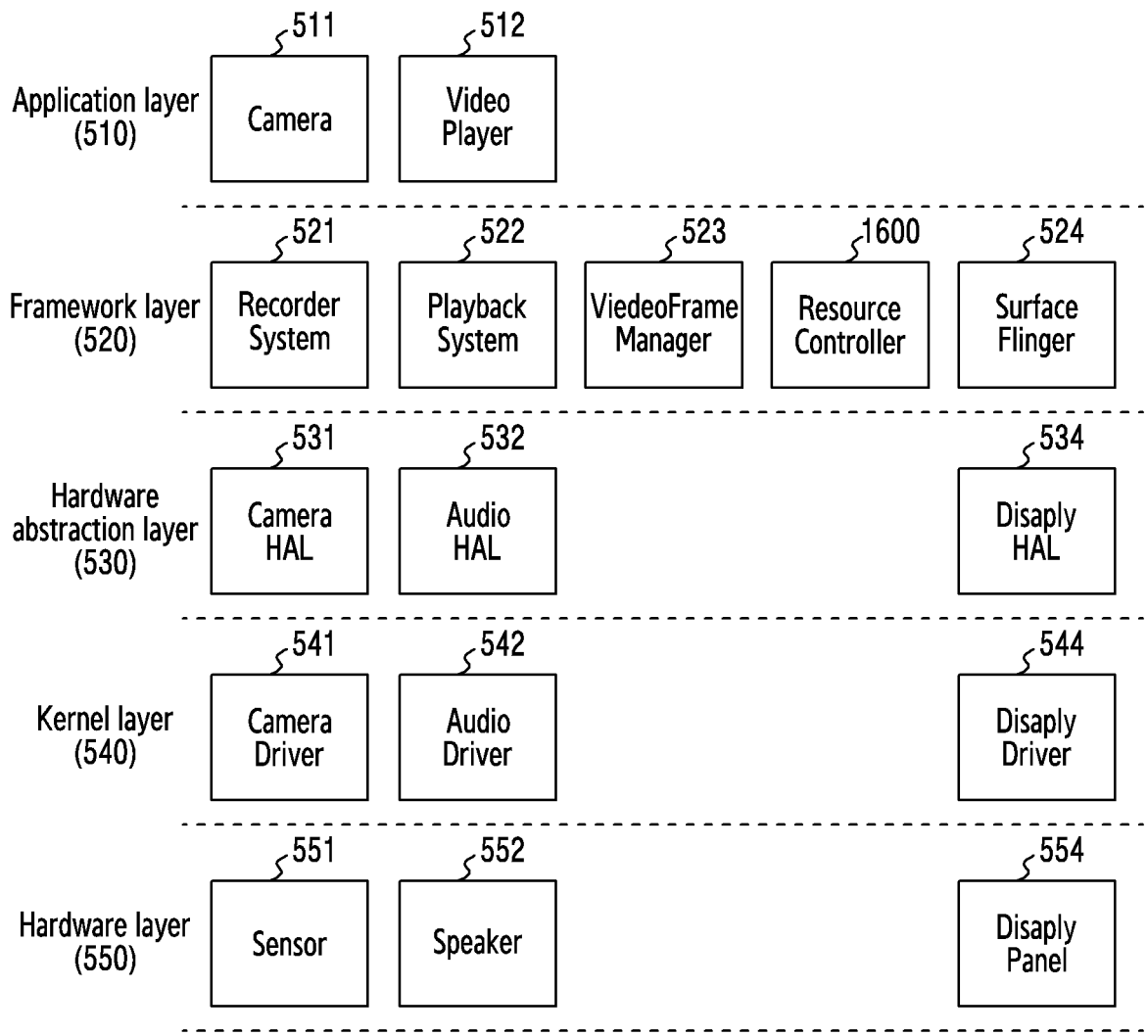
FIG. 16 is a diagram illustrating a software system architecture for an electronic device to reproduce video data in consideration of resources of the electronic device, according to an embodiment of the disclosure.

FIG. 16 is a diagram illustrating a software system architecture for an electronic device (e.g., the electronic device 101 of FIG. 1 or 2) to reproduce video data in consideration of resources of the electronic device, according to an embodiment of the disclosure.

The software system architecture according to various embodiments may include an application layer 510, a framework layer 520, a hardware abstraction layer 530, a kernel layer 540, and a hardware layer 550.

In order to reproduce video data in consideration of the resource of the electronic device, the framework layer 520 may further include a resource controller 1600. The resource controller 1600 may determine an output frame rate, based on status information on the reproduction video data and information on resources of the electronic device, and provide the determined output frame rate to the video frame manager 523. The video frame manager 523 may determine a processing method for the reproduction video data, based on the determined output frame rate and output the output video data having the determined output frame rate.

Figure 17:
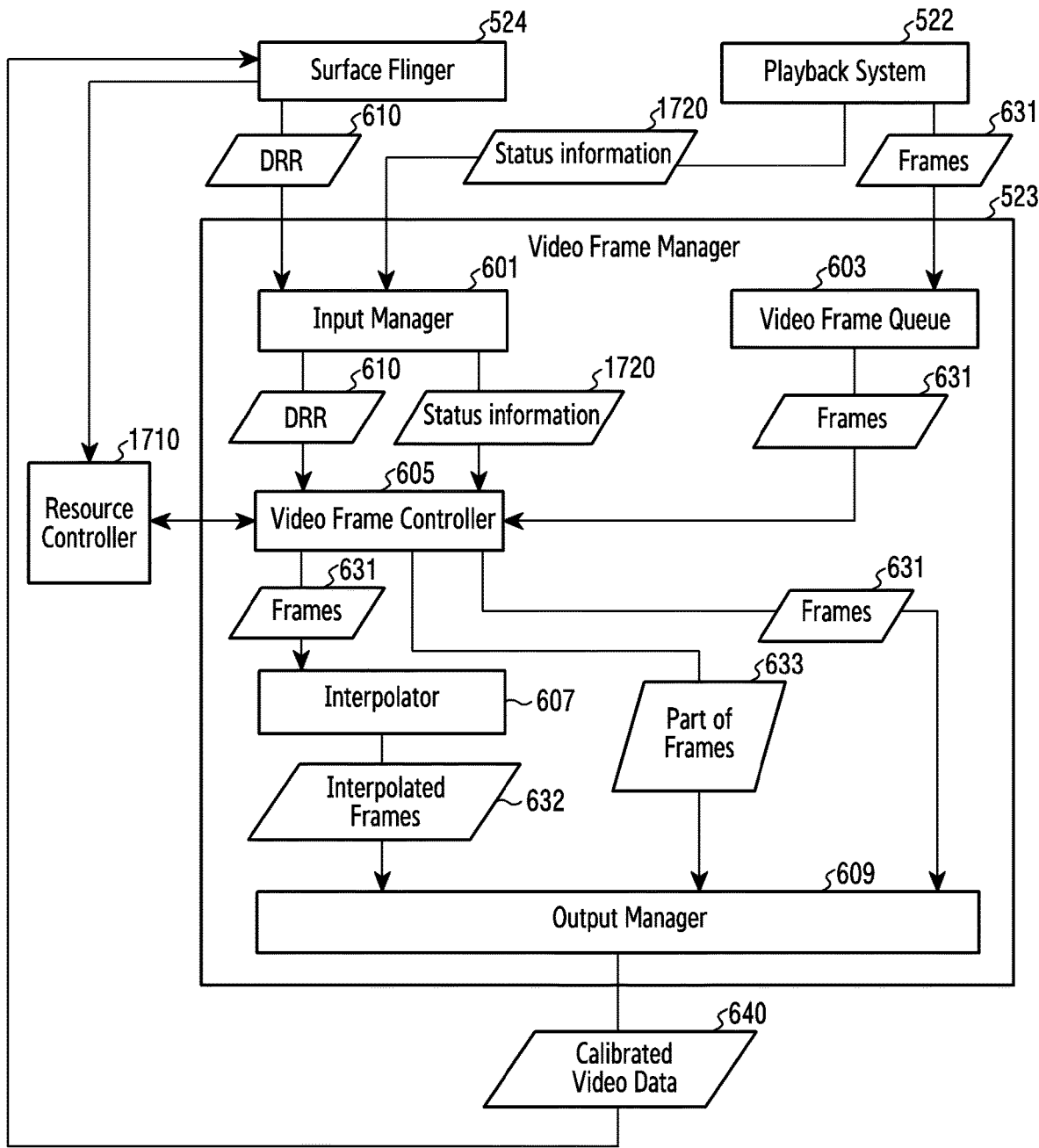
FIG. 17 is a diagram illustrating a process in which an electronic device performs an operation of a video frame manager in consideration of a resource, according to an embodiment of the disclosure.

FIG. 17 is a diagram illustrating a process in which an electronic device (e.g., the electronic device 101 of FIG. 1 or 2) performs an operation of a video frame manager 523 in consideration of a resource, according to an embodiment of the disclosure.

The video frame manager 523 may include an input manager 601, a video frame queue 603, a video frame controller 605, an interpolator 607, and an output manager 609. FIG. 17 is for explaining the function of the video frame manager 523, and the configuration of the video frame manager 523 is not limited to the components shown in FIG. 17. Components of the video frame manager 523 shown in FIG. 17 may be replaced with other components, or additional components may be included in the video frame manager 523.

The input manager 601 may receive information necessary for the operation of the video frame manager 523 from other components, and transmit the input information to the video frame controller 605. According to various embodiments, the input manager 601 may receive information on the display refresh rate 610 from the surface flinger 524, and receive the status information 1720 on the reproduction video data together with the information on the reproduction frame rate from the reproduction system 522.

The video frame controller 605 may receive the information on the display refresh rate 610 and the reproduction frame rate, and status information 1720 received through the input manager 601. The video frame controller 605 may transmit the information on the display refresh rate 610 and the reproduction frame rate and status information 1720 to the resource controller 1710. The resource controller 1710 according to various embodiments may determine an output frame rate in consideration of a resource required to process a frame in the reproduction video data, based on the information on the display refresh rate 610 and the reproduction frame rate and the status information 1720. For example, because an additional resource is required to increase the output frame rate for playing one video content in a state in which a plurality of video contents are being reproduced, the resource controller 1710 may decrease an output frame rate for the remaining video content. According to another embodiment, the resource controller 1710 may obtain information on a state in which the video content being reproduced is being displayed on the screen from the surface flinger 524. For example, the resource controller 1710 may obtain information on the size of a region in which video content is displayed on the screen. The resource controller 1710 may determine an output frame rate, based on information about a state in which the content obtained from the surface flinger 524 is being displayed on the screen. The resource controller 1710 may transmit the determined output frame rate to the video frame controller 605.

The video frame queue 603 may receive and buffer the frames 631 output from the reproduction system 522. The video frame controller 605 may determine a processing operation for the frames 631 stored in the video frame queue 603, based on the output frame rate received from the resource controller 1710. For example, when the output frame rate is lower than the reproduction frame rate, the video frame controller 605 may output portion 633 of frames in which unnecessary frames are discarded among the frames 631. The video frame controller 605 may output the frames 631 as they are when the output frame rate is the same as the reproduction frame rate. When the output frame rate is greater than the reproduction frame rate, the video frame controller 605 may output data including interpolated frames 632 through the interpolator 607.

The output manager 609 may transmit the modified video data 640 to the surface flinger 524 so that the modified video data 640 including the frames 631, the interpolated frames 632, or a portion 633 of the frames is output through the display. According to various embodiments, the video frame controller 605 and the interpolator 607 may operate asynchronously. When the video frame controller 605 and the interpolator 607 operate asynchronously, the output manager 609 may store the received frames in a separate video frame queue, rearrange them according to an actual output order of the received frames, and output the frames in the rearranged order.

Figure 18:
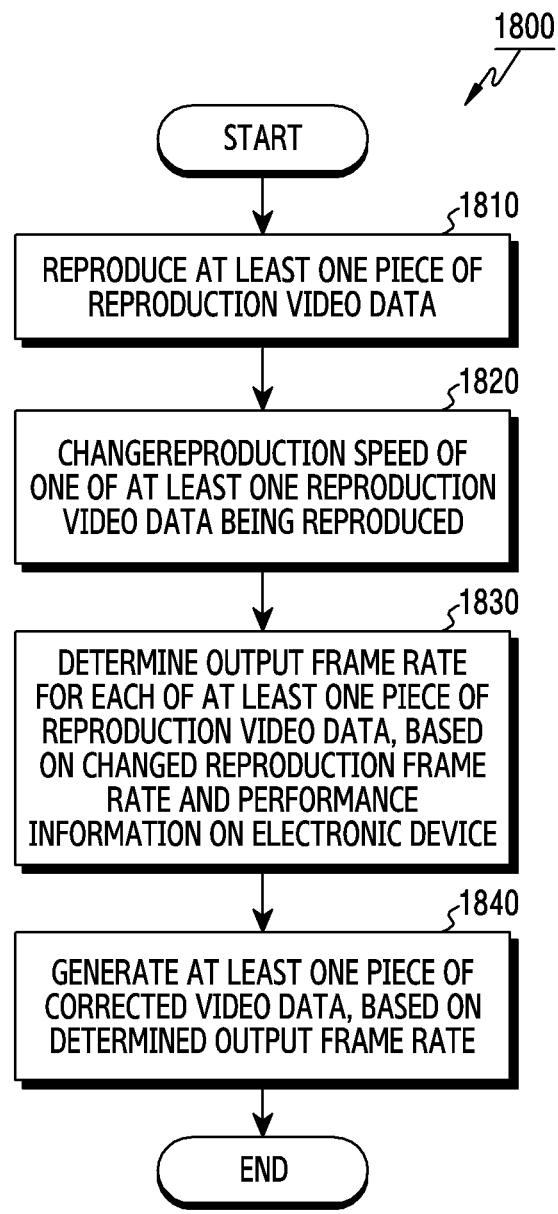
FIG. 18 is a flowchart illustrating a process of outputting at least one piece of video data, based on a reproduction speed at which an electronic device reproduces a reproduction video according to an embodiment of the disclosure.

FIG. 18 is a flowchart 1800 illustrating a process of outputting at least one piece of video data, based on a reproduction speed at which an electronic device (e.g., the electronic device 101 of FIG. 1 or 2) reproduces a reproduction video according to an embodiment of the disclosure.

The electronic device may perform operation 1810 of playing at least one piece of reproduction video data. For example, when three video contents are being reproduced, the electronic device may display a screen configured by synthesizing frames of reproduction video data for respective video contents in three pop-up windows as shown in FIG. 14. At least one piece of reproduction video data may be replaced with execution screens of different types of applications. For example, a screen configured by synthesizing a screen of a browser having different content frame rates and an execution screen of a game application may be displayed.

The electronic device may perform operation 1820 of changing the reproduction speed of any one of the at least one reproduction video data being played back. For example, in response to a user input to change the reproduction speed of any one of the video content displayed in each of the three pop-up windows, the reproduction speed of the video content may be changed.

The electronic device may perform operation 1830 of determining an output frame rate for each of at least one piece of reproduction video data, based on the reproduction frame rate according to the changed reproduction speed and performance information on the electronic device. The electronic device may perform operation 1840 of generating at least one piece of modified video data from each reproduction video data, based on each determined output frame rate. The electronic device may display frames included in the generated at least one modified video data through the display.

Figure 19:
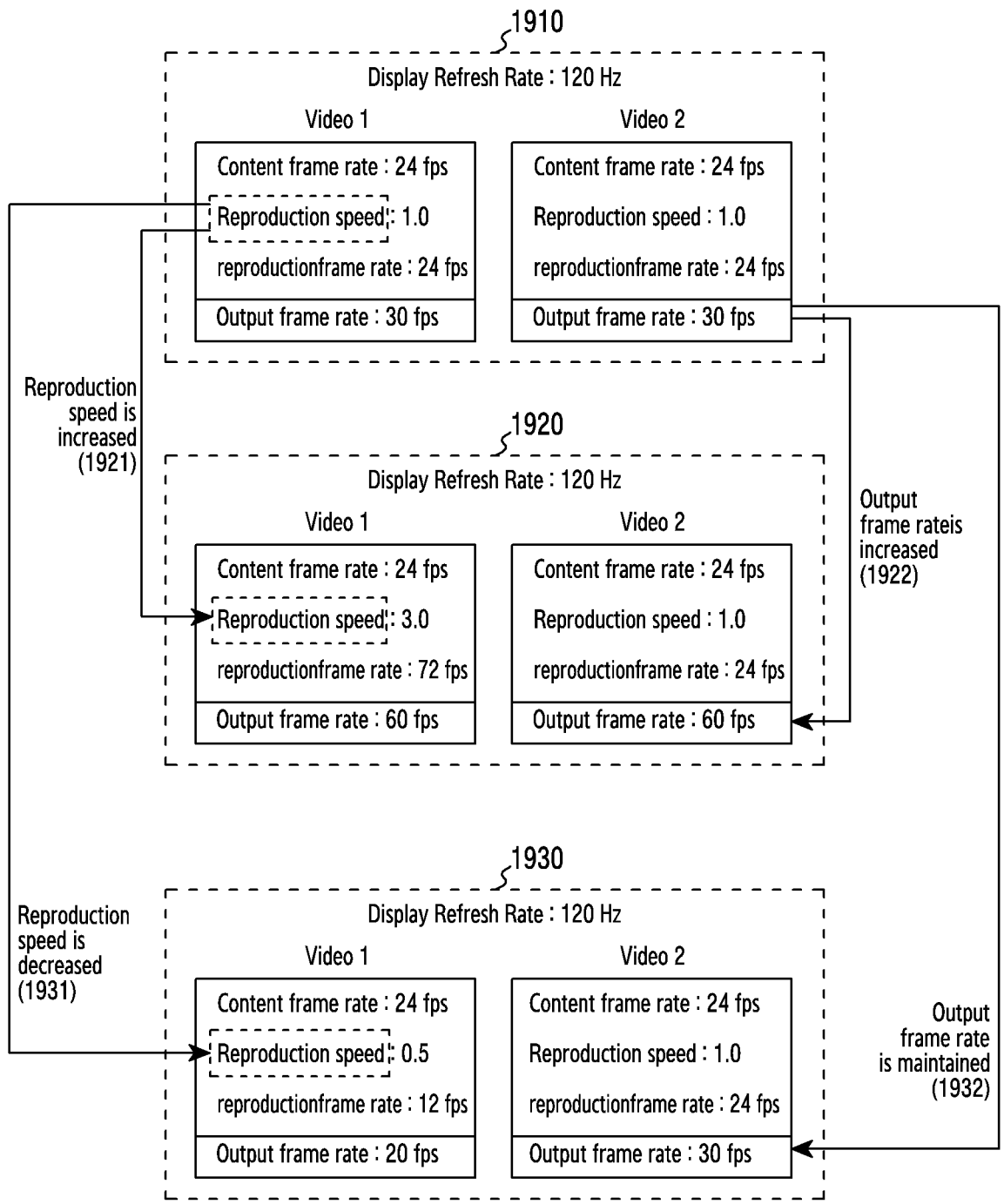
FIG. 19 is a diagram illustrating an example in which an electronic device determines an output frame rate of a plurality of pieces of video data, based on a reproduction speed, according to an embodiment of the disclosure.

FIG. 19 is a diagram illustrating an example in which an electronic device (e.g., the electronic device 101 of FIG. 1 or 2) determines an output frame rate of a plurality of pieces of video data, based on a reproduction speed, according to an embodiment of the disclosure.

FIG. 19 shows an example of outputting an image reproducing a first video and a second video having a content frame rate of 24 fps through a display having a display refresh rate of 120 Hz. According to various embodiments, at least one of the first video and the second video may be replaced with content other than the video. For example, the electronic device may perform the operation shown in FIG. 19 and the related description even when the first video having a content frame rate of 24 fps and the execution screen of the instant messenger application are output.

In a first state 1910 in which the reproduction speed of the first video and the second video are both 1×, both the output frame rate for the first video and the output frame rate for the second video may be determined to be 30 fps.

When the reproduction speed of the first video increases (1921) and the second state 1920 is changed to 3 times, the reproduction frame rate of the first video is changed to 72 fps. Accordingly, the output frame rate for the first video may be changed to 60 fps. In addition, the processing method for the frame of the first video is a processing method of adding frames by generating interpolated frames in the first state 1910, but in the second state 1920, the frame rate may be lowered by discarding some of the frames in the reproduction video data. Since the operation of generating the interpolated frames requires more resources than the operation of discarding some of the frames, in the second state 1920, resources required to process the frame of the first video may be reduced. Accordingly, the electronic device may increase (1922) an output frame rate for the second video.

Conversely, when the reproduction speed of the first video is reduced (1931) and the third state 1930 is changed to 0.5 times, the reproduction frame rate of the first video may be changed to 12 fps. Since the processing method for the frame of the first video is a processing method in which frames are added in the first state 1910 and the second state 1920 so that the output frame rate is higher than the reproduction frame rate, the change in the resource requirement is small. Accordingly, the electronic device may maintain the output frame rate for the second video (1932).

Figure 20:
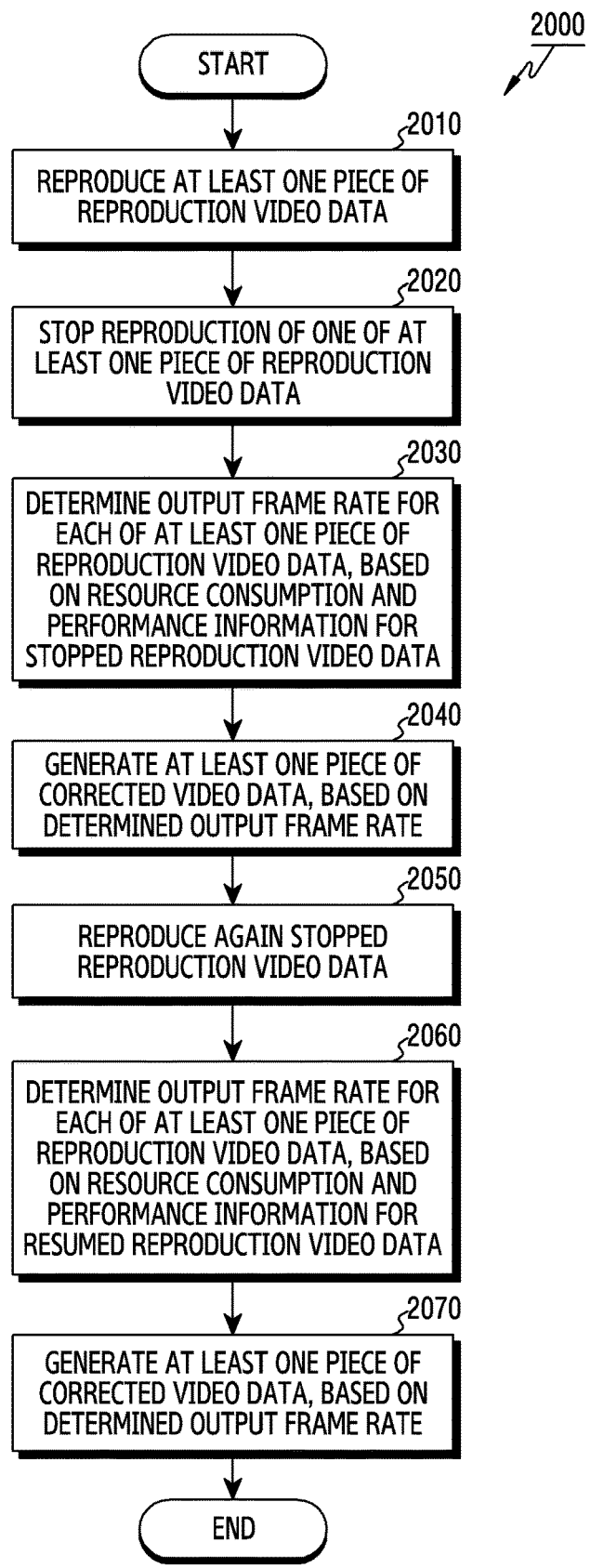
FIG. 20 is a flowchart illustrating a process in which an electronic device outputs at least one piece of video data, based on whether the electronic device is paused, which is an example of a reproduction state of the electronic device, according to an embodiment of the disclosure.

FIG. 20 is a flowchart 2000 illustrating a process in which an electronic device (e.g., the electronic device 101 of FIG. 1 or 2) outputs at least one piece of video data, based on whether the electronic device is paused, which is an example of a reproduction state of the electronic device, according to an embodiment of the disclosure.

The electronic device may perform operation 2010 of playing at least one piece of reproduction video data. The electronic device may perform operation 2020 of stopping the reproduction of any one of the at least one piece of reproduction video data. For example, the electronic device may stop the reproduction of the reproduction video data in response to a touch input for selecting an icon for stopping the reproduction of the reproduction video data.

The electronic device may perform an operation 2030 of determining an output frame rate for each of the at least one reproduction video data, based on resource consumption and performance information for the still reproduction video data. For example, since processing of the still reproduction video data is stopped, the electronic device may increase the output frame rate for the other reproduction video data so that the resource used for processing the still reproduction video data can be used for processing other video data.

The electronic device may perform operation 2040 of generating at least one modified video data, based on the determined output frame rate and outputting the generated at least one modified video data through a display.

The electronic device may perform operation 2050 of resuming reproducing of the stopped reproduction video data. For example, the electronic device may resume reproducing of the reproduction video data in response to a touch input for selecting an icon for resuming reproducing of the reproduction video data.

The electronic device may perform operation 2060 of determining an output frame rate for each of the at least one reproduction video data, based on resource consumption and performance information for the reproduction video data whose reproduction is resumed. For example, since processing of the resumed reproduction video data is required, the electronic device may reduce an output frame rate for other reproduction video data. In operation 2070, the electronic device may generate at least one piece of modified video data, based on the determined output frame rate.

The process shown in the flowchart of FIG. 20 may be similarly applied to a case where an execution screen of another application is displayed together with a screen for playing a video. For example, the electronic device may display execution screens of an Internet browser and an instant messenger application on a display together with a video streaming image. When an Internet browser loads an Internet page or a message transmission/reception operation occurs frequently by an instant messenger, the load applied to the processor increases in the electronic device, and thus the output frame rate of the streaming video image may be adjusted to be low. Conversely, when the Internet browser is displaying a still image, or when an operation by the instant messenger application is not performed and is in a non-operational state (idle state), the output frame rate of the video streaming image may be adjusted to be high.

Figure 21:
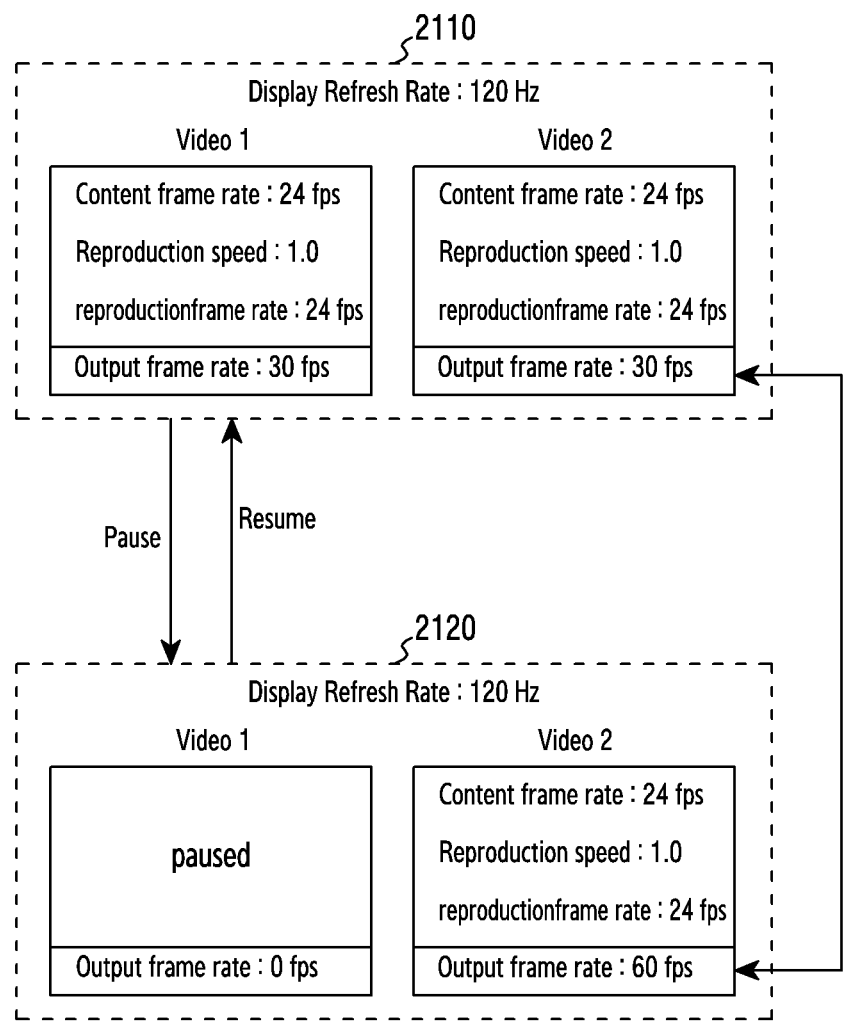
FIG. 21 is a diagram illustrating an example in which an electronic device determines output frame rates of a plurality of pieces of video data, based on whether the video data is paused, according to an embodiment of the disclosure.

FIG. 21 is a diagram illustrating an example in which an electronic device (e.g., the electronic device 101 of FIG. 1 or 2) determines output frame rates of a plurality of pieces of video data, based on whether the video data is paused, according to an embodiment of the disclosure.

FIG. 20 shows an example of a case in which images for reproducing a first video and a second video having a content frame rate of 24 fps are output through a display having a display refresh rate of 120 Hz.

In a first state 2110 in which both the first video and the second video are being reproduced, the electronic device may determine both the output frame rate of the first video and the output frame rate of the second video to be 30 fps.

When the second state 2120 in which the reproduction of the first video is stopped, the first video is not reproduced, and thus the output frame rate becomes 0. In the second state 2120, the electronic device may increase the output frame rate of the second video to 60 fps.

Figure 22:
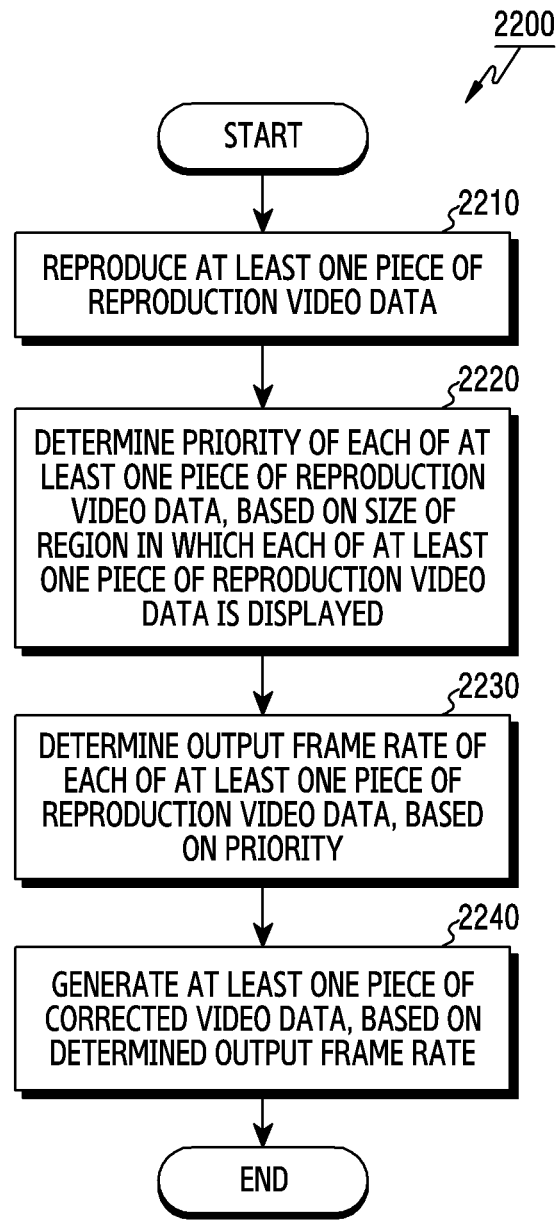
FIG. 22 is a flowchart illustrating a process in which an electronic device reproduces at least one piece of video data, based on a size of a region displaying at least one piece of video data, according to an embodiment of the disclosure.

FIG. 22 is a flowchart 2200 illustrating a process in which an electronic device (e.g., the electronic device 101 of FIG. 1 or 2) reproduces at least one piece of video data, based on a size of a region displaying at least one piece of video data, according to an embodiment of the disclosure.

The electronic device may perform operation 2210 of playing at least one piece of reproduction video data. The electronic device may perform operation 2220 of determining a priority of each of the at least one piece of reproduction video data, based on the size of a region in which each of the at least one piece of reproduction video data is displayed. The size of the region in which the reproduction video data is displayed may include, for example, at least one of a diagonal length, a region, a horizontal length, and a vertical length of a window in which the video is displayed. The electronic device may determine a priority for each of the reproduction video data so that a higher priority is given to the reproduction video data displayed in a region having a larger size.

The electronic device may perform operation 2230 of determining an output frame rate of each of the at least one piece of reproduction video data, based on the priority. For example, the electronic device may determine an output frame rate of each of the at least one reproduction video data so that the reproduction video data having a high priority can be output based on the high output frame rate. The electronic device may perform operation 2240 of generating at least one modified video data so that the reproduction video data is output based on the determined output frame rate.

Figure 23:
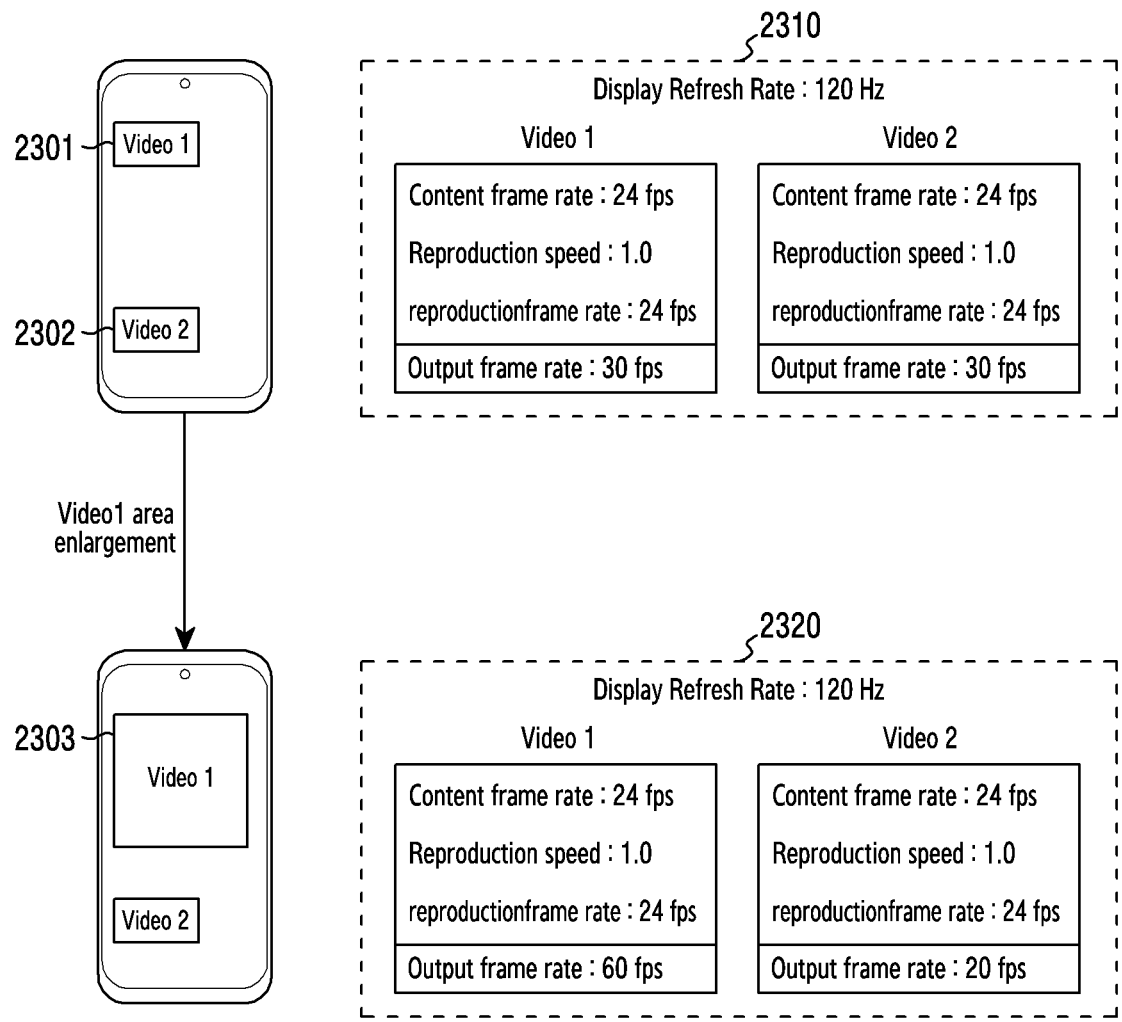
FIG. 23 is a diagram illustrating an example in which an electronic device determines output frame rates of a plurality of video data, based on sizes of regions displaying respective pieces of video data, according to an embodiment of the disclosure.

FIG. 23 is a diagram illustrating an example in which an electronic device (e.g., the electronic device 101 of FIG. 1 or 2) determines output frame rates of a plurality of video data, based on sizes of regions displaying respective pieces of video data, according to an embodiment of the disclosure.

FIG. 23 shows an example of a case in which images for reproducing a first video and a second video having a content frame rate of 24 fps are output through a display having a display refresh rate of 120 Hz.

In a first state 2310 in which the size of the region 2301 displaying the first video and the region 2302 displaying the second video are the same, both the output frame rate of the first video and output frame rate of the second video may be determined to 30 fps.

In the second state 2320 in which the first video is displayed in the enlarged region 2303 (e.g., when a pinch-out gesture for the region 2301 is input to the electronic device by the user), the electronic device may determine that the priority of the first video is higher than that of the second video. The electronic device may increase the output frame rate of the first video to 60 fps, based on the priority. In order to increase the output frame rate of the first video within a limited resource, the electronic device may decrease the output frame rate of the second video to 20 fps.

Figure 24:
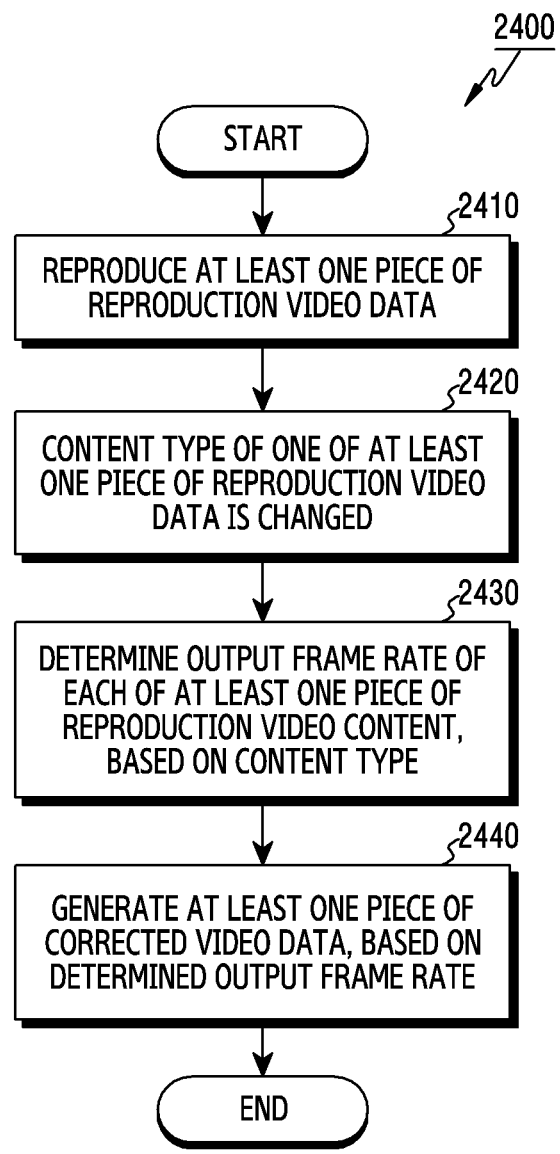
FIG. 24 is a flowchart illustrating a process in which an electronic device reproduces at least one piece of video data, based on a content type of the reproduction video data, according to an embodiment of the disclosure.

FIG. 24 is a flowchart 2400 illustrating a process in which an electronic device (e.g., the electronic device 101 of FIG. 1 or 2) reproduces at least one piece of video data, based on a content type of the reproduction video data, according to an embodiment of the disclosure.

The electronic device may perform operation 2410 of playing at least one piece of reproduction video data.

The electronic device may perform operation 2420 of identifying that the content type of one of at least one piece of reproduction video data being reproduced has been changed. For example, the electronic device may identify whether a video being played during video streaming is changed to an advertisement video inserted in the middle.

The electronic device may perform operation 2430 of determining an output frame rate for at least one reproduction video content, based on the identified content type. For example, when the type of the reproduction video content is changed to the advertisement content, the electronic device may decrease the output frame rate of the reproduction video content changed to the advertisement content and increase the output frame rate of the other reproduction video content. The electronic device may perform operation 2440 of generating at least one piece of modified video data to be output through a display, based on the determined output frame rate.

Figure 25:
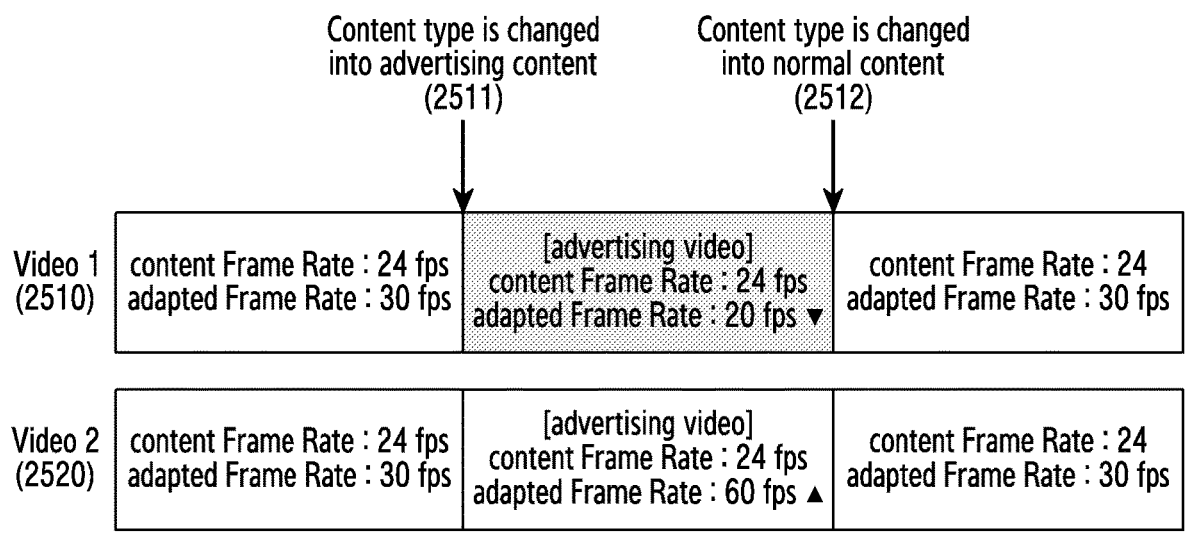
FIG. 25 is a diagram illustrating an example in which an electronic device determines output frame rates of a plurality of pieces of video data, based on a content type of the video data to be reproduced according to an embodiment of the disclosure.

FIG. 25 is a diagram illustrating an example in which an electronic device (e.g., the electronic device 101 of FIG. 1 or 2) determines output frame rates of a plurality of pieces of video data, based on a content type of the video data to be reproduced according to an embodiment of the disclosure.

FIG. 25 shows an example of a case in which images reproduced by a first video 2510 and a second video 2520 having a content frame rate of 24 fps are output through a display having a display refresh rate of 120 Hz.

The electronic device may determine both the output frame rate of the first video 2510 and the output frame rate of the second video 2520 to be 30 fps before the point 2511 at which the content type is changed to the advertisement content.

When the content type of the first video 2510 is changed to advertisement content (point 2511), the electronic device may reduce the output frame rate of the first video 2510 to 20 fps, and increase the output frame rate of the second video 2520 to 60 fps by using a surplus of resources generated due to a decrease in the output frame rate of the first video 2510.

When the content type of the first video 2510 is changed to normal content (2512), the electronic device may return the output frame rates of the first video 2510 and the second video 2520 to 30 fps.

Figure 26:
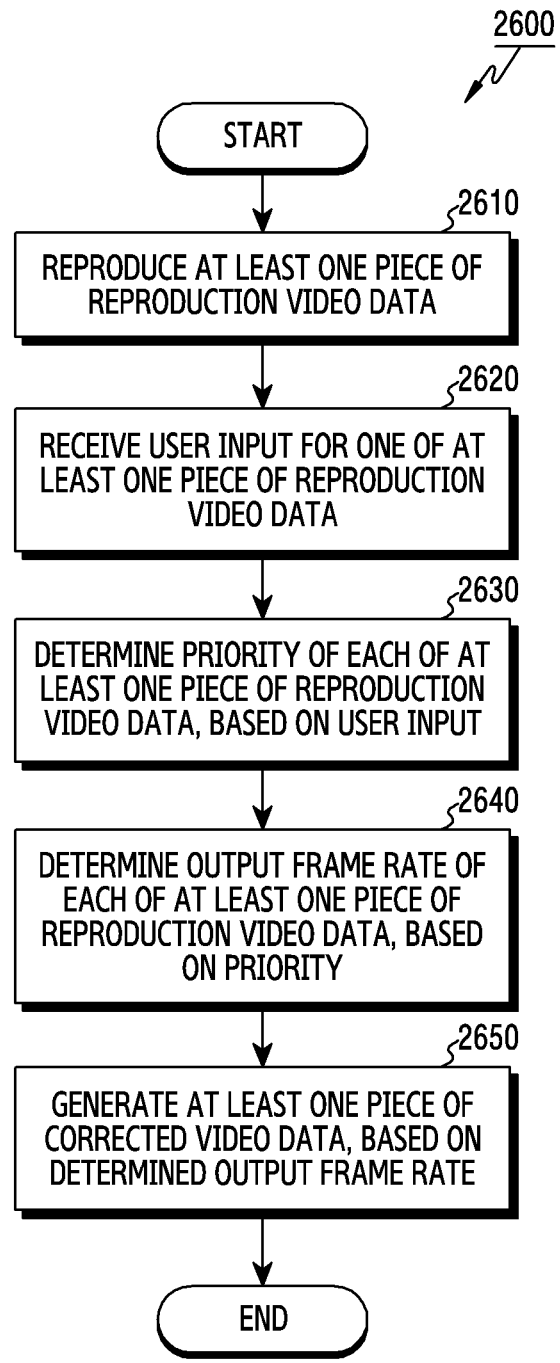
FIG. 26 is a flowchart illustrating a process in which an electronic device reproduces at least one piece of video data, based on a user input, according to an embodiment of the disclosure.

FIG. 26 is a flowchart 2600 illustrating a process in which an electronic device (e.g., the electronic device 101 of FIG. 1 or 2) reproduces at least one piece of video data, based on a user input, according to an embodiment of the disclosure.

The electronic device may perform operation 2610 of playing at least one piece of reproduction video data.

The electronic device may perform operation 2620 of receiving a user input for one of at least one piece of reproduction video data. For example, the electronic device may receive a touch input for a region in which one of at least one window in which at least one piece of reproduction video data is displayed, respectively. Finally, the reproduction video data or window that received the user input may be referred to as 'focused'.

The electronic device may perform operation 2630 of determining a priority for each of at least one piece of reproduction video data, based on a user input. For example, the electronic device may give the focused reproduction video data a higher priority than that of other reproduction video data.

The electronic device may perform operation 2640 of determining a reproduction frame rate for each of the at least one piece of reproduction video data, based on the priority. For example, the electronic device may determine an output frame rate of each of the at least one reproduction video data so that the reproduction video data having a high priority can be output based on the high output frame rate. The electronic device may perform operation 2650 of generating at least one modified video data so that the reproduction video data is output based on the determined output frame rate.

Figure 27:
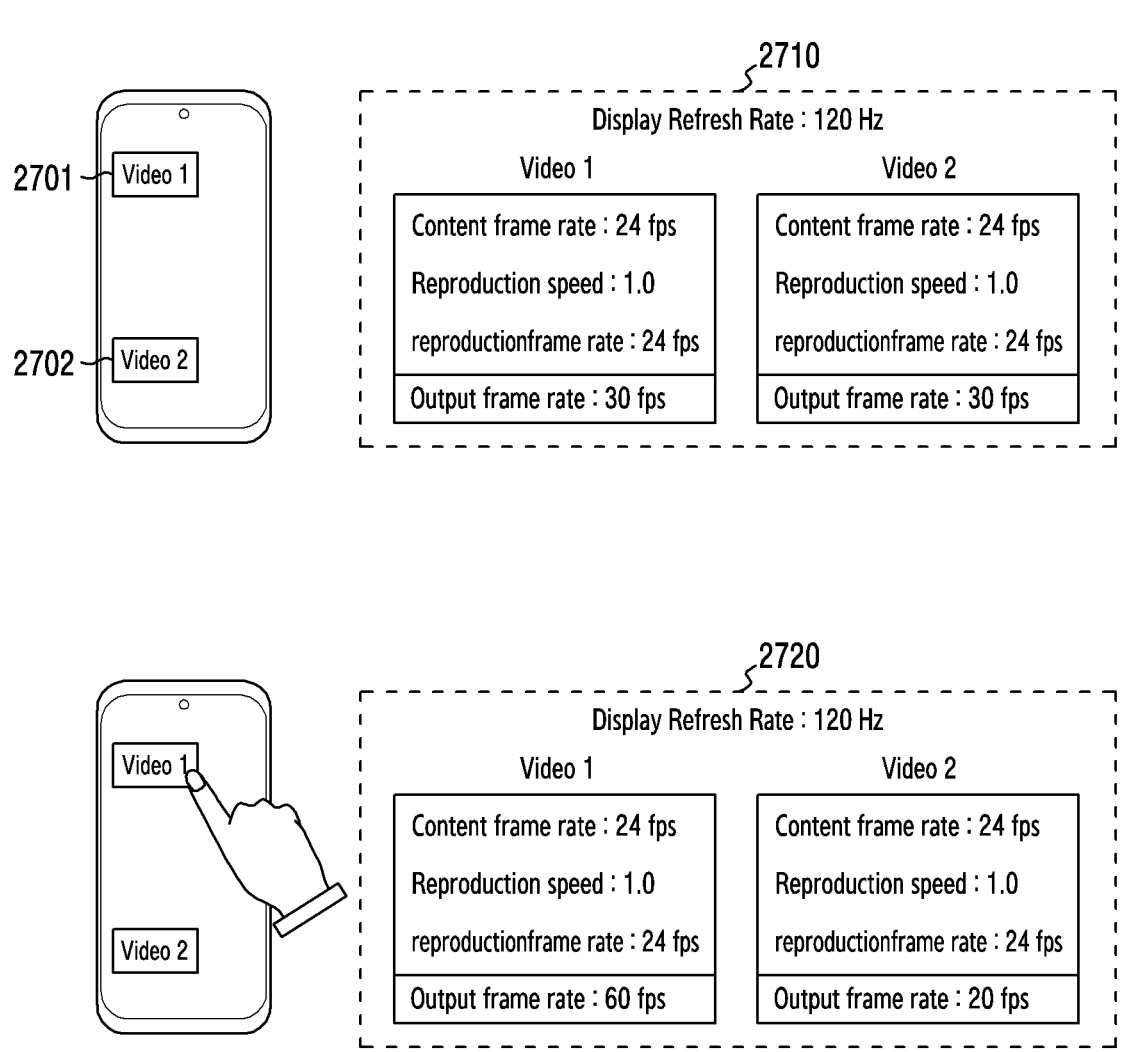
FIG. 27 is a diagram illustrating an example in which an electronic device determines an output frame rate of a plurality of video data, based on a user input, according to an embodiment of the disclosure.

FIG. 27 is a diagram illustrating an example in which an electronic device (e.g., the electronic device 101 of FIG. 1 or 2) determines an output frame rate of a plurality of video data, based on a user input, according to an embodiment of the disclosure.

FIG. 27 shows an example of a case in which images for reproducing a first video and a second video having a content frame rate of 24 fps are output through a display having a display refresh rate of 120 Hz.

In a first state 2710 before a user input for selecting a region 2701 in which the first video is displayed or a region 2702 in which the second video is displayed is received, is received, both the output frame rate of the first video and the output frame rate of the second video may be determined to be 30 fps.

In a second state 2720 after the user input for the region 2701 in which the first video is displayed is received, the electronic device may determine that the priority of the first video is higher than that of the second video. The electronic device may increase the output frame rate of the first video to 60 fps, based on the priority. In order to increase the output frame rate of the first video within a limited resource, the electronic device may decrease the output frame rate of the second video to 20 fps.

The embodiments disclosed in this document do not necessarily have to be configured separately from each other, and features of the embodiments may be combined with each other. For example, when the modified video data is generated by determining the output frame rate, based on the reproduction frame rate and the display refresh rate changed in operation 1040 of FIG. 10, the processor of the electronic device may determine a candidate frame rate, based on the reproduction frame rate and the display refresh rate, and may determine a candidate frame rate that satisfies a performance condition of the electronic device among the candidate frame rates as the output frame rate.

An electronic device according to various embodiments may include a display that displays a screen, based on a display refresh(update) rate, a memory, and at least one processor operatively connected to the display and the memory.

The at least one processor may be configured to determine a first output frame rate, based on the display refresh rate, output first reproduction video data of a first reproduction frame rate through the display, receive a user input for changing the first reproduction frame rate to a second reproduction frame rate, change a reproduction frame rate of the first reproduction video data to the second reproduction frame rate from the first reproduction frame rate and output first modified video data of the first output frame rate through the display, in response to the user input. The first modified video data may be obtained from the first reproduction video data of the second reproduction frame rate.

The at least one processor may be configured to change a reproduction speed of the first reproduction video data in response to the user input.

The at least one processor may be configured to determine a candidate frame rate, based on a second reproduction frame rate and the display refresh rate, and determine, as the first output frame rate, a maximum frame rate among candidate frame rates that satisfy a condition determined based on performance information on the electronic device.

The at least one processor may be configured to output, in response to the user input, second reproduction video data of a third reproduction frame rate together with the first reproduction video data of the first reproduction frame rate through the display, and output second modified video data of a second output frame rate determined based on the third reproduced frame rate and the display refresh rate, together with the first modified video data. The second modified video data may be obtained from the second reproduction video data of the third reproduction frame rate.

The at least one processor may be configured to determine the first output frame rate and the second output frame rate, based on first status information on the first reproduction video data and second status information on the second reproduction video data.

The first status information may include information indicating whether to pause the reproduction of the first reproduction video data.

The at least one processor may be configured to decrease the first output frame rate of the first reproduction video data and to increase the second output frame rate of the second modified video data, when the first status information indicates that the reproduction of the first reproduction video data is in a paused state.

The first status information may include information indicating a content type of the first reproduction video data being output.

The at least one processor may be configured to decrease a first output frame rate of the first reproduction video data and to increase the second output frame rate of the second modified video data, when the first status information indicates that the content type is advertisement content.

The at least one processor may be configured to receive a user input for the first modified video data or the second modified video data displayed through the display, determine a priority for at least one of the first modified video data or the second modified video data, based on whether a user input for the first modified video data or the second modified video data is received, and determine at least one of the first output frame rate or the second output frame rate, based on the priority.

The at least one processor may be configured to determine a priority for at least one of the first modified video data and the second modified video data, based on a size of a region in which the first modified video data is displayed and a size of a region in which the second modified video data is displayed, and determine at least one of the first output frame rate or the second output frame rate, based on the priority.

The at least one processor may be configured to generate the first modified video data by discarding some frames of the first reproduction video data when the second reproduction frame rate is greater than the display refresh rate, and determine whether to discard a frame, based on a frame number and a rate value determined based on the second reproduction frame rate and the display refresh rate.

The at least one processor may be configured to generate the first modified video data to include frames generated by interpolating at least some of the frames of the first reproduction video data when the second reproduction frame rate is less than the display refresh rate, and determine the first output frame rate, based on the interpolation performance information of the electronic device, the second reproduction frame rate, and the display refresh rate.

The electronic device may further include a camera for acquiring an image, the second reproduction frame rate may be a frame rate of a video recorded using image information obtained through the camera, and the first modified video data may be a preview image displayed while recording the recorded video.

The at least one processor may be configured to, in response to a change in the display refresh rate, change the first output frame rate, based on the change in the display refresh rate.

A method of operating an electronic device may include obtaining a display refresh rate of the display, determining a first output frame rate, based on the display refresh rate, outputting first reproduction video data having a first reproduction frame rate through the display, receiving a user input for changing the first reproduction frame rate to a second reproduction frame rate, changing, in response to the user input, a reproduction frame rate of the first reproduction video data to the second reproduction frame rate from the first reproduction frame rate, and outputting first modified video data generated to have a first output frame rate from the first reproduction video data having the second reproduction frame rate through the display. The first modified video data may be obtained from the first reproduction video data of the second reproduction frame rate.

The method of operating the electronic device may further include changing the reproduction speed of the first reproduction video data in response to the user input.

The electronic device may include a display that displays a screen, based on a display refresh(update) rate, a memory, and at least one processor operatively connected to the display and the memory.

The at least one processor may be configured to output reproduction video data of a reproduction frame rate through the display, determine content information about the content of the reproduction video data, and output the modified video data of an output frame rate determined based on the changed content information and the display refresh rate, when the content information is changed. The modified video data may be obtained from the reproduction video data.

The at least one processor may be configured to determine reproduction information related to the operation of reproducing the reproduction video data, and determine the output frame rate, based on the reproduction information.

The reproduction information may include at least one of reproduction frame rate of the reproduction video data including variable frame rate video or information on a data source for obtaining video data through video streaming.

The reproduction information may include information about a reproduction speed at which the reproduction video data is reproduced.

The reproduction information may include information indicating whether the reproduction video data is in a state selected by a user input.

The reproduction information may include information about the size of an area where the reproduction video data is displayed.

The content information may include information about the type of content reproduced by the reproduction video data.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display configured to display a screen, based on a display refresh rate;
memory, comprising one or more storage media, storing instructions; and
at least one processor communicatively coupled to the display and the memory,
wherein the instructions, when executed by the at least one processor individually or collectively, cause the electronic device to:
identify first reproduction video data having a first reproduction frame rate,
receive a user input to change the first reproduction frame rate to a second reproduction frame rate which is different from the first reproduction frame rate,
change the first reproduction frame rate of the first reproduction video data to the second reproduction frame rate,
compare the second reproduction frame rate and the display refresh rate,
determine a first output frame rate based on the comparison,
output first modified video data having the first output frame rate through the display, wherein the first modified video data is obtained from the first reproduction video data having the second reproduction frame rate,
based on the second reproduction frame rate being smaller than the display refresh rate, generate the first modified video data to include frames generated by interpolating at least some of the frames of the first reproduction video data, determine a candidate frame rate, based on the second reproduction frame rate and the display refresh rate, and determine, as the first output frame rate, a maximum frame rate among candidate frame rates that satisfy a condition determined based on performance information on the electronic device.

2. The electronic device of claim 1, wherein the instructions that, when executed by the at least one processor individually or collectively, further cause the electronic device to change a reproduction speed of the first reproduction video data in response to the user input.

3. The electronic device of claim 1, wherein the instructions that, when executed by the at least one processor individually or collectively, further cause the electronic device to:

output, in response to the user input, second reproduction video data having a third reproduction frame rate together with the first reproduction video data having the first reproduction frame rate through the display, and output second modified video data having a second output frame rate determined based on the third reproduced frame rate and the display refresh rate, together with the first modified video data, wherein the second modified video data is obtained from the second reproduction video data having the third reproduction frame rate.

4. The electronic device of claim 3, wherein the instructions that, when executed by the at least one processor individually or collectively, further cause the electronic device to determine the first output frame rate and the second output frame rate, based on first status information on the first reproduction video data and second status information on the second reproduction video data.

5. The electronic device of claim 4, wherein the first status information comprises information indicating whether to pause reproduction of the first reproduction video data, and wherein the instructions that, when executed by the at least one processor individually or collectively, further cause the electronic device to decrease the first output frame rate for outputting the first reproduction video data and to increase the second output frame rate for outputting the second modified video data, in case that the first status information indicates that the reproduction of the first reproduction video data is in a paused state.

6. The electronic device of claim 4, wherein the first status information comprises information indicating a content type of the first reproduction video data being output, and wherein the instructions that, when executed by the at least one processor individually or collectively, further cause the electronic device to decrease the first output frame rate for outputting the first reproduction video data and to increase the second output frame rate for outputting the second modified video data, in case that the first status information indicates that the content type is advertisement content.

7. The electronic device of claim 3, wherein the instructions that, when executed by the at least one processor individually or collectively, further cause the electronic device to:

receive a user input for the first modified video data or the second modified video data displayed through the display, determine a priority for at least one of the first modified video data or the second modified video data, based on whether a user input for the first modified video data or the second modified video data is received, and determine at least one of the first output frame rate or the second output frame rate, based on the priority.

8. The electronic device of claim 3, wherein the instructions that, when executed by the at least one processor individually or collectively, further cause the electronic device to:

determine a priority for at least one of the first modified video data and the second modified video data, based on a size of a region in which the first modified video data is displayed and a size of a region in which the second modified video data is displayed, and determine at least one of the first output frame rate or the second output frame rate, based on the priority.

9. The electronic device of claim 1, wherein the instructions that, when executed by the at least one processor individually or collectively, further cause the electronic device to:

generate the first modified video data by discarding some frames of the first reproduction video data in case that the second reproduction frame rate is greater than the display refresh rate, and determine whether to discard a frame, based on a frame number and a rate value determined based on the second reproduction frame rate and the display refresh rate.

10. The electronic device of claim 1, wherein the instructions that, when executed by the at least one processor individually or collectively, further cause the electronic device to:

determine the first output frame rate, based on interpolation performance information of the electronic device, the second reproduction frame rate, and the display refresh rate.

11. The electronic device of claim 1, further comprising:

a camera configured to acquire an image, wherein the second reproduction frame rate is a frame rate of a video recorded using image information obtained through the camera, and wherein the first modified video data is a preview image displayed while recording the recorded video.

12. The electronic device of claim 1, wherein the instructions that, when executed by the at least one processor individually or collectively, further cause the electronic device to, in response to a change in the display refresh rate, change the first output frame rate, based on the change in the display refresh rate.

13. A method of operating an electronic device, the method comprising:

obtaining a display refresh rate of the display;

identifying first reproduction video data having a first reproduction frame rate;

receiving a user input to change the first reproduction frame rate to a second reproduction frame rate which is different from the first reproduction frame rate;

changing, in response to the user input, the first reproduction frame rate of the first reproduction video data to the second reproduction frame rate;

comparing the second reproduction frame rate and the display refresh rate;

determining a first output frame rate based on the comparison;

outputting first modified video data having the first output frame rate through the display, wherein the first modified video data is obtained from the first reproduction video data having the second reproduction frame rate the second reproduction frame rate;

based on the second reproduction frame rate being smaller than the display refresh rate, generate the first modified video data to include frames generated by interpolating at least some of the frames of the first reproduction video data;

determining a candidate frame rate, based on the second reproduction frame rate and the display refresh rate; and determining, as the first output frame rate, a maximum frame rate among candidate frame rates that satisfy a condition determined based on performance information on the electronic device.

14. The method of claim 13, further comprising changing a reproduction speed of the first reproduction video data in response to the user input.

\* \* \* \* \*